United States Patent [19]

Imai et al.

[11] Patent Number: 5,739,813
[45] Date of Patent: Apr. 14, 1998

[54] THREE-DIMENSIONAL IMAGE SPECIAL EFFECT APPARATUS

[75] Inventors: Atsushi Imai; Yutaka Isobe, both of Kanagawa, Japan

[73] Assignee: Sony Corporation, Tokyo, Japan

[21] Appl. No.: 455,832

[22] Filed: May 31, 1995

Related U.S. Application Data

[62] Division of Ser. No. 224,674, Apr. 7, 1994, Pat. No. 5,521,617.

[30] Foreign Application Priority Data

| Apr. 15, 1993 | [JP] | Japan | P05-088768 |
| Apr. 15, 1993 | [JP] | Japan | P05-088776 |
| Apr. 15, 1993 | [JP] | Japan | P05-088781 |
| Apr. 16, 1993 | [JP] | Japan | P05-089630 |
| Apr. 16, 1993 | [JP] | Japan | P05-089633 |

[51] Int. Cl.⁶ .................................................. G09G 5/08
[52] U.S. Cl. .................................................. 345/167
[58] Field of Search ............................ 345/163–167, 345/184

[56] References Cited

U.S. PATENT DOCUMENTS

| 3,304,434 | 2/1967 | Koster ........................ 345/165 |
| 3,643,148 | 2/1972 | Brown et al. . |
| 4,493,992 | 1/1985 | Geller ......................... 345/167 |
| 4,580,782 | 4/1986 | Ochi . |
| 4,652,871 | 3/1987 | Tsukada et al. . |
| 4,734,690 | 3/1988 | Waller . |
| 4,933,670 | 6/1990 | Wislocki . |
| 4,939,508 | 7/1990 | Lawrence et al. . |
| 4,952,919 | 8/1990 | Nippoldt . |
| 4,994,795 | 2/1991 | Mackenzie . |
| 5,027,109 | 6/1991 | Donovan et al. . |
| 5,195,179 | 3/1993 | Tokunaga . |
| 5,237,311 | 8/1993 | Mailey et al. . |
| 5,287,120 | 2/1994 | Okada et al. .................. 345/163 |
| 5,313,229 | 5/1994 | Gilligan et al. ............... 345/157 |
| 5,333,247 | 7/1994 | Gest et al. . |

FOREIGN PATENT DOCUMENTS

| 0 387 981 A1 | 9/1990 | European Pat. Off. ........ H04N 5/262 |
| 2-282818 | 11/1990 | Japan ........................ G06F 3/033 |
| 2282818 | 11/1990 | Japan ........................ G06F 3/033 |
| 2-143638 | 12/1990 | Japan ........................ G06F 3/033 |
| WO 82/03712 | 10/1982 | WIPO ........................ G06F 15/20 |

OTHER PUBLICATIONS

Kiyoshi Inoue, "System–G Enables Real–Time 3D Texture Mapping," 2209 JEE Journal of Electronic Engineering, Special Issue NAB '90, 27 (1990), Tokyo, JP, pp. 64–67.

*Primary Examiner*—Jeffery Brier
*Attorney, Agent, or Firm*—Limbach & Limbach L.L.P.

[57] ABSTRACT

A three-dimensional image special effect apparatus in which a track ball controls movement of a special image on a display screen. First and second rotation detection means detect the rotation of the track ball in first and second orthogonal directions. The apparatus further includes a device for comparing the outputs of the first and second rotation detectors and allowing only the one of the two outputs having higher value to be output.

7 Claims, 21 Drawing Sheets

THREE-DIMENSIONAL IMAGE SPECIAL EFFECT APPARATUS

This is a divisional of application Ser. No. 08/224,674, filed Apr. 7, 1994, now U.S. Pat. No. 5,521,617.

BACKGROUND OF THE INVENTION

1. Field of the Invention

This invention relates to a three-dimensional image special effect apparatus, and more particularly to a three-dimensional image special effect apparatus having a three-dimensional inputting apparatus.

2. Description of the Related Art

A three-dimensional image special effect apparatus is used to obtain such a special effect as to, for example, expand or contract or turn and move a special image fitted in another image on a monitor. In a three-dimensional image special effect apparatus of the type mentioned, a three-dimensional inputting apparatus such as a spherical track ball or a joy-stick in the form of a lever is used to operate the special image.

A three-dimensional inputting apparatus which employs a rotary ring in place of a track ball is also known and disclosed in Japanese Patent Laid-Open Application No. Heisei 2-28282.8 and Japanese Utility Model Laid-Open Application No. Heisei 2-143638, which correspond to U.S. Patent application Ser. No. 512,860 filed Apr. 23, 1990, now abandoned.

By the way, various conditions of a special image such as a size or a border of the special image are given as parameters, and various effects can be achieved by suitably setting such parameters. The parameters are displayed on various menus, and for example, a track ball is manually operated to move a cursor on a menu to the position of a parameter and then a value of the parameter is set by manual operation of an inputting key such as a function key located separately from the track ball.

With the three-dimensional inputting apparatus described above, since the track ball for operating the cursor and the inputting key for setting a parameter are provided separately from each other, it is impossible to operate them at a time by one hand, and accordingly, a parameter setting operation is cumbersome.

It may be a possible idea to use a joy-stick as an inputting key. Where a joy-stick is employed, since a special image continues to move at a predetermined speed in a selected direction only by tilting a lever, operation is comparatively easy even to move a special image to a distance.

In contrast, where a track ball is employed, a special image is operated by rotating the track ball, and if rotation of the track ball is stopped, also the special image is stopped. Accordingly, in order to move the special image to a distance, the track ball must be manually operated several times to rotate the same in a same direction, which is very cumbersome. Further, since the amount of rotation of the track ball is not fixed in this instance, there is a problem in that the movement of the special image is not smooth.

A similar problem gives rise also to a rotary ring which is disposed for rotation around a track ball to operate a special image in a Z direction, that is, in a depthwise direction.

Further, a three-dimensional image special effect apparatus can represent in perspective representation, and when a special image is positioned at a distance in a depthwise direction as viewed on a screen of a monitor, the size of the special image is smaller than that when the special image is positioned nearer. Further, if input data to the three-dimensional inputting apparatus are same, the speeds of movement of a special image at a distance and another image in the neighborhood, that is, amounts of movement at the locations with respect to the input data, are equal to each other.

Accordingly, even if the amount of rotation of, for example, a track ball is equal, a special image at a distance as viewed on the screen of a monitor looks moving a small distance while another special image in the neighborhood looks moving a long distance. This makes an observer of the image have a perspective feeling.

However, with the three-dimensional image special effect apparatus of the type just described, when it is tried to move a special image at a distance to a predetermined position on the monitor, the track ball or some other manually operable member must be manually operated by a greater number of times than when it is tried to move another special image in the neighborhood. Further, a special image in the neighborhood may move from an end to another end of the screen only by manual operation of the track ball or a like element by a small amount. This may sometimes make a trouble.

A track ball is supported so that it can be rotated by a weak force in order to assure high operability and sensitivity. Consequently, when data other than three-dimensional data are inputted by way of, for example, ten keys, vibrations may be produced on an entire panel by a shock upon depression of the ten keys. Such vibrations may be transmitted to rotate the track ball so that inadvertent three-dimensional data may be inputted. In this instance, a special effect of an image will be disturbed.

Further, if the sensitivity of the track ball is raised, then also the influence of vibrations is increased. Therefore, the sensitivity must be restricted suitably.

SUMMARY OF THE INVENTION

It is an object of the present invention to provide a three-dimensional image special effect apparatus by which operation for setting a parameter can be performed simply.

It is another object of the present invention to provide a three-dimensional image special effect apparatus wherein a special image can be moved smoothly to a distance only by a single manual operation of a track ball or a rotary ring.

It is a further object of the present invention to provide a three-dimensional image special effect apparatus by which the relationship between the amount of operation of a data inputting section and the distance of movement of a special image can be determined optimally in response to the distance to the special image in a depthwise direction.

It is a still further object of the present invention to provide a three-dimensional image special effect apparatus having a track ball movement detection apparatus by which a special image or a cursor can be positioned with a high degree of accuracy by means of a track ball.

In order to attain the objects described above, according to the present invention, there is provided a three-dimensional image special effect apparatus, which comprises a track ball for operating a special image produced by an image special effect processing section in two-dimensional directions, a rotary ring disposed along an outer periphery of the track ball for operating the special image in a third three-dimensional direction, switch means for establishing a condition in which a parameter for determining a condition of the special image can be set, setting menu production means for producing a setting menu for setting a parameter which determines a condition of the special image, and means responsive to the switch means for causing a cursor for designating a parameter on the setting menu to be operated by way of the track ball and causing a value of the parameter to be set by way of the rotary ring.

Preferably, the three-dimensional image special effect apparatus further comprises data holding means for holding data inputted by a rotating operation of the track ball, and means responsive to the data holding means for moving the special image in a predetermined vector when the track ball is operated for a predetermined period of time and continuing the movement of the special image in the predetermined vector until after the track ball is operated at a next time.

Alternatively, the three-dimensional image special effect apparatus may further comprise data holding means for holding data inputted by a rotating operation of the rotary ring, and means responsive to the data holding means for moving the special image in a predetermined vector when the rotary ring is operated for a predetermined period of time and continuing the movement of the special image in the predetermined vector until after the rotary ring is operated at a next time.

Or else, the three-dimensional image special effect apparatus may further comprise first rotation detection means for detecting an amount of rotation of the track ball in a first direction, second rotation detection means for detecting an amount of rotation of the track ball in a second direction perpendicular to the first direction, rotational amount comparison means for comparing outputs of the first and second rotation detection means with each other, and means for outputting one of the outputs of the first and second rotation detection means which is determined to have a higher output by the rotational amount comparison means as a detected amount of motion of the track ball.

Or otherwise, the three-dimensional image special effect apparatus may further comprise means for modifying input data from the track ball and the rotary ring in accordance with distance data of the special image in a depthwise direction and outputting the modified data as three-dimensional input data.

Alternatively, the three-dimensional image special effect apparatus may further comprise data input switch means for inputting data, and means for limiting supply of data from the track ball or the rotary ring when the data from the track ball or the rotary ring are inputted simultaneously with data from the data input switch means.

Or else, the three-dimensional image special effect apparatus may further comprise vibration detection means for detecting vibrations of a panel on which the track ball and the rotary ring are provided, and means for limiting supply of data from the track ball and the rotary ring in response to an output of the vibration detection means.

The above and other objects, features and advantages of the present invention will become apparent from the following description and the appended claims, taken in conjunction with the accompanying drawings in which like parts or elements are denoted by like reference characters.

Figure 1:
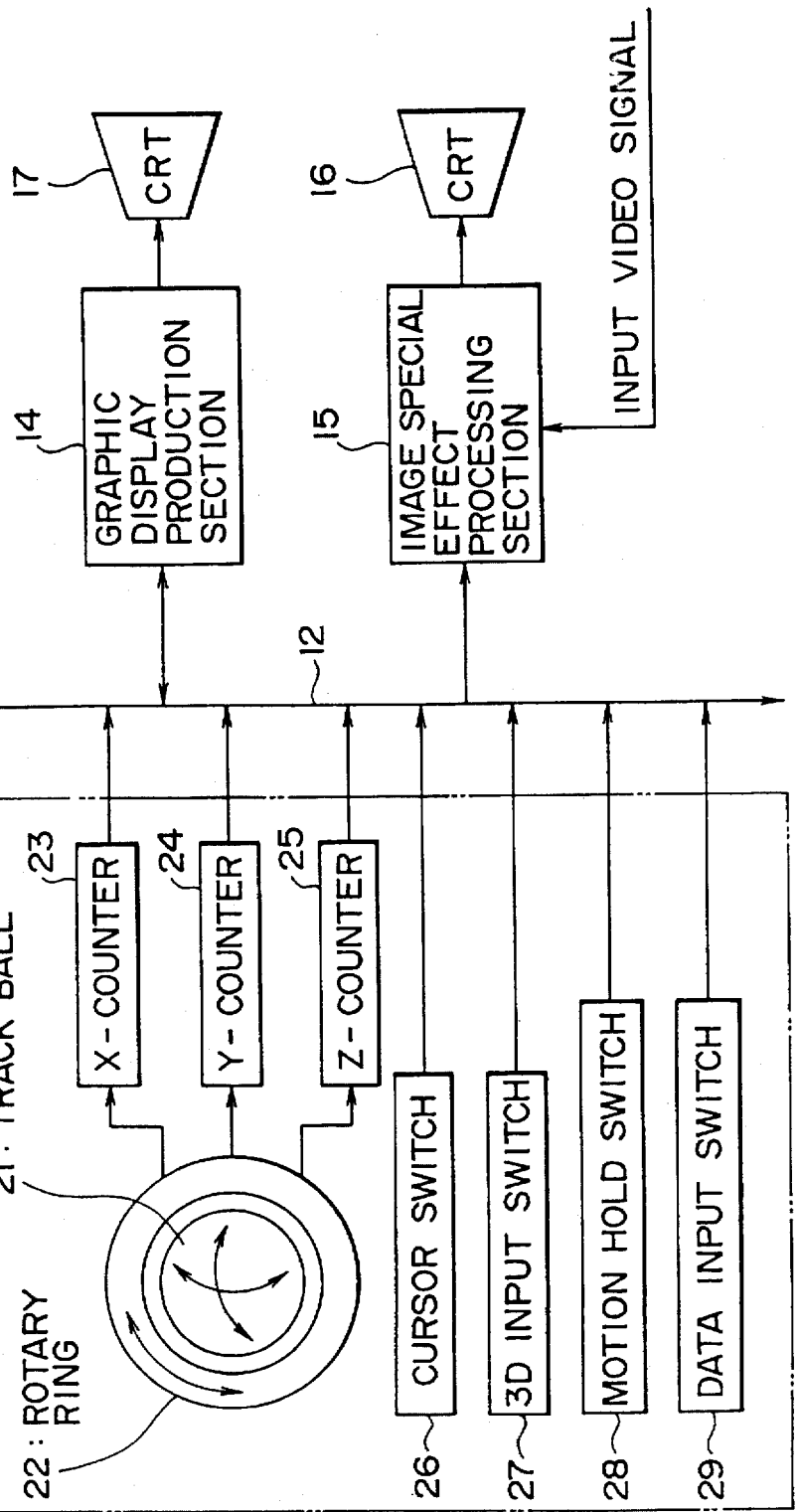
FIG. 1 is a three-dimensional image special effect apparatus to which the present invention is applied.
Figure 12:
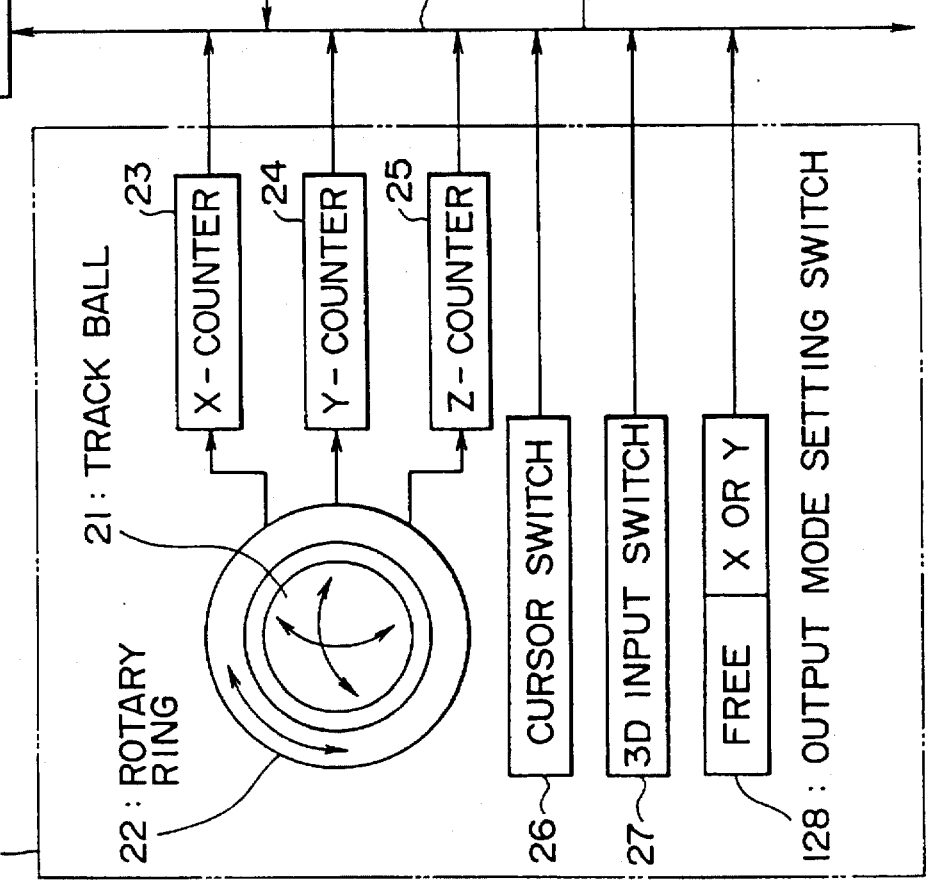
Figure 13:
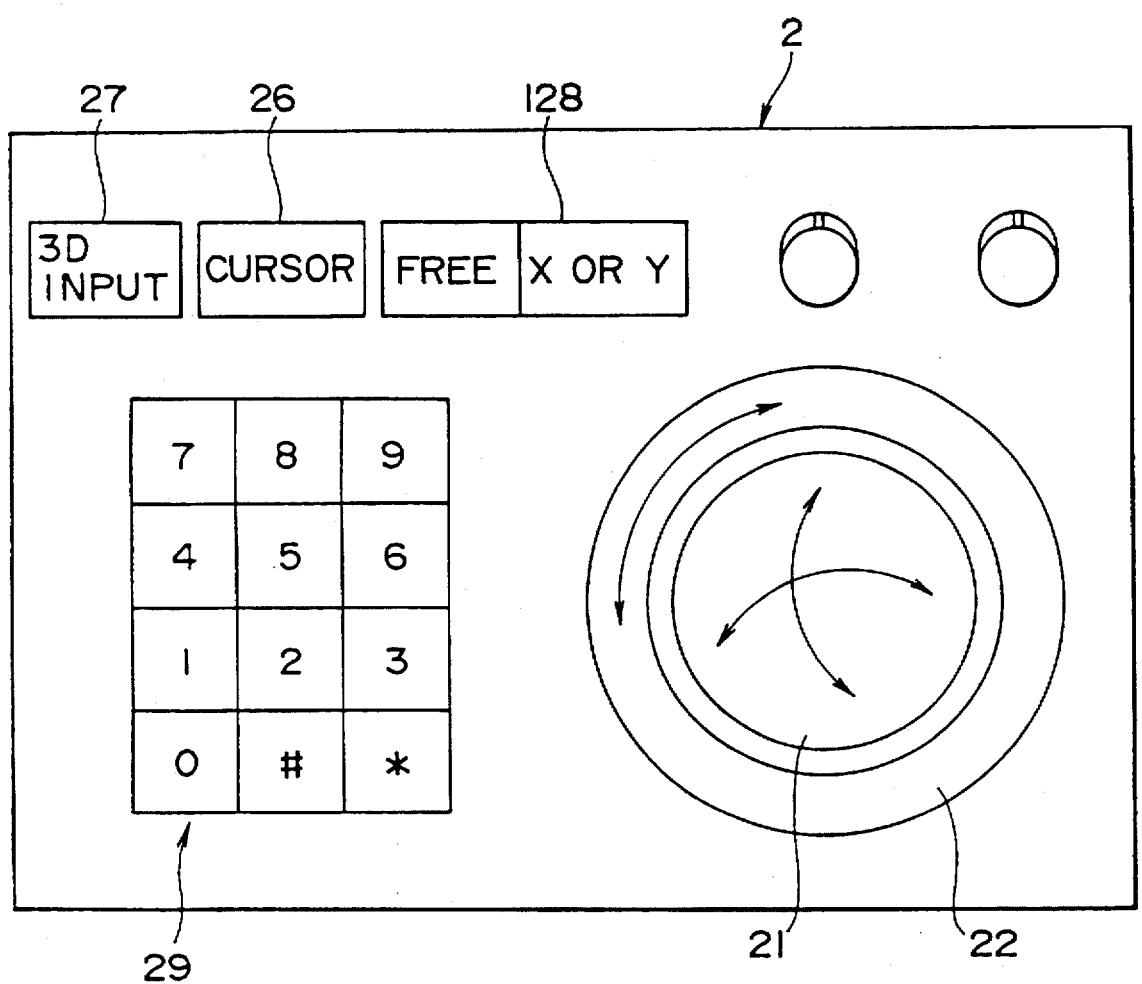
Figure 14:
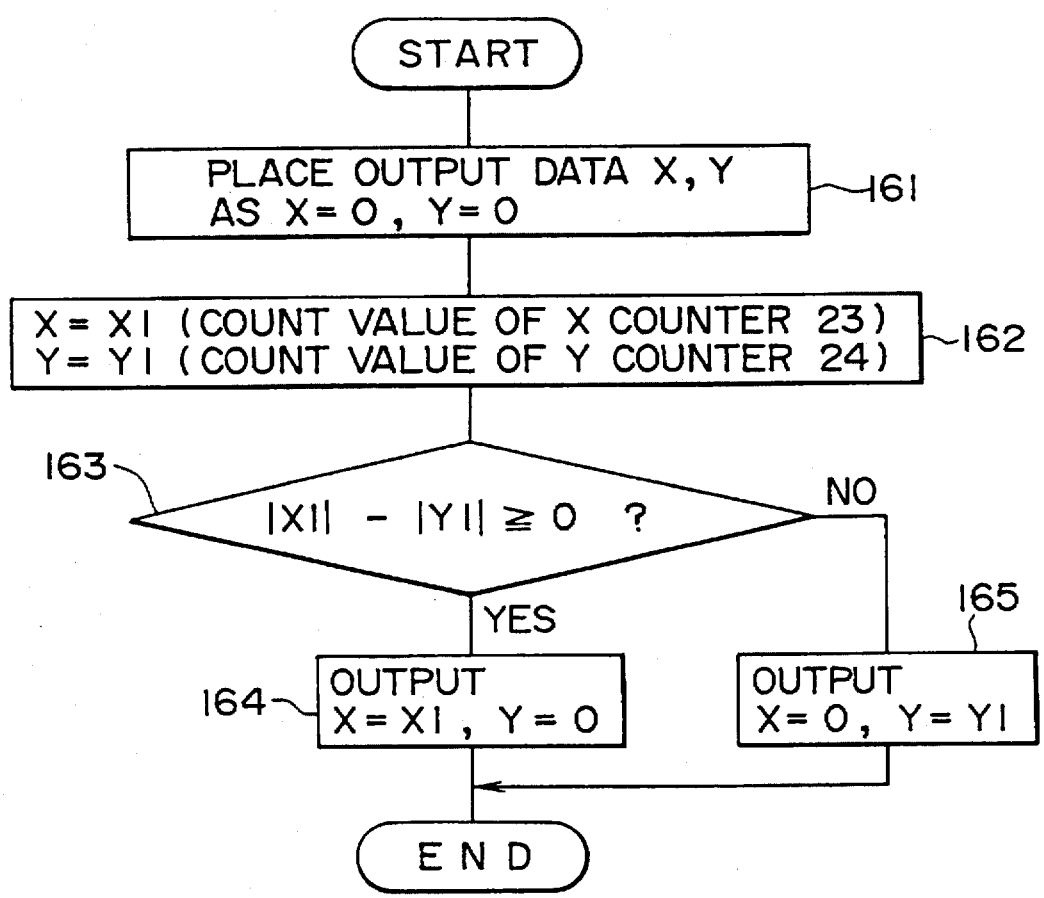
Figure 15:
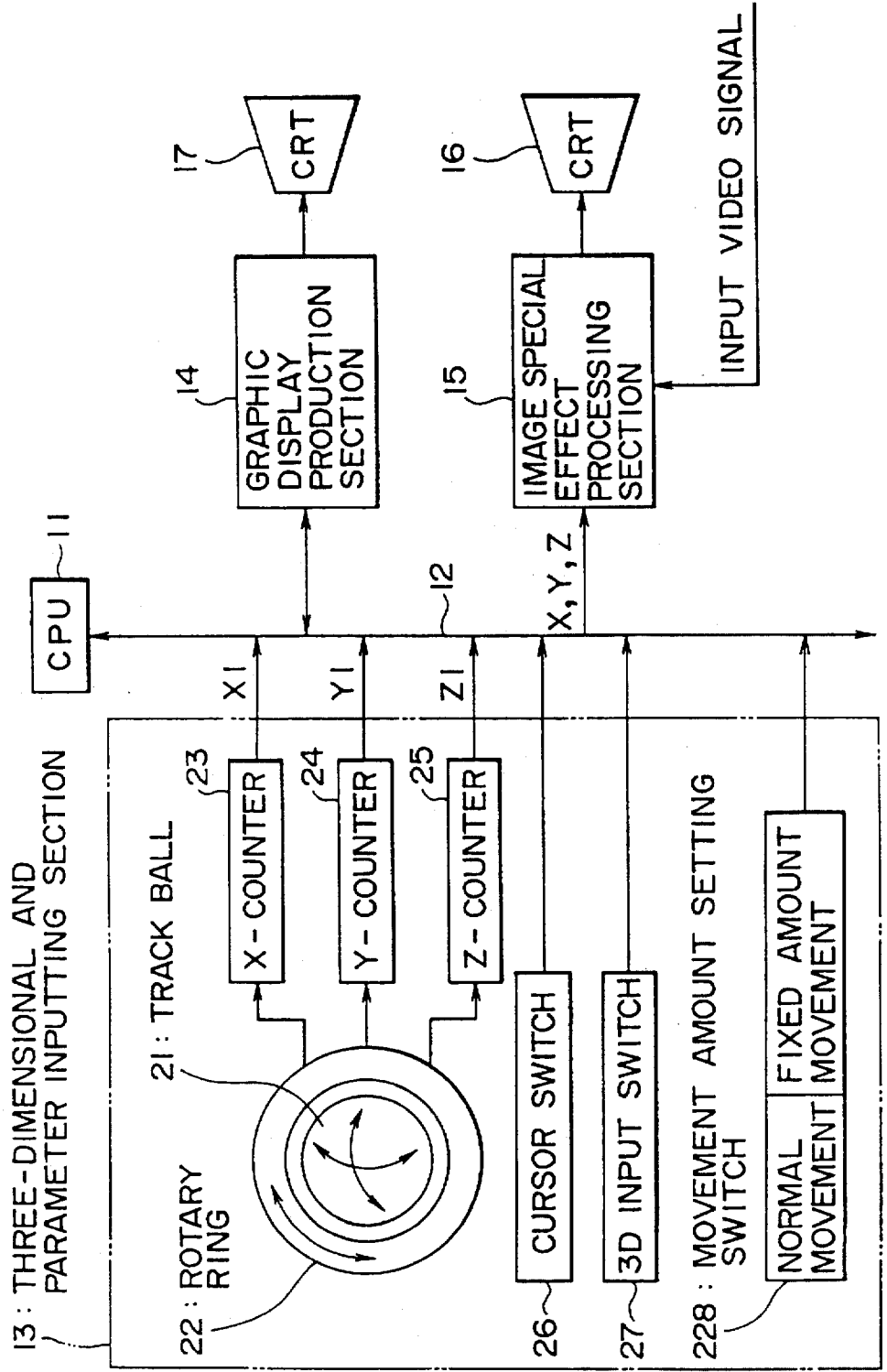
Figure 16:
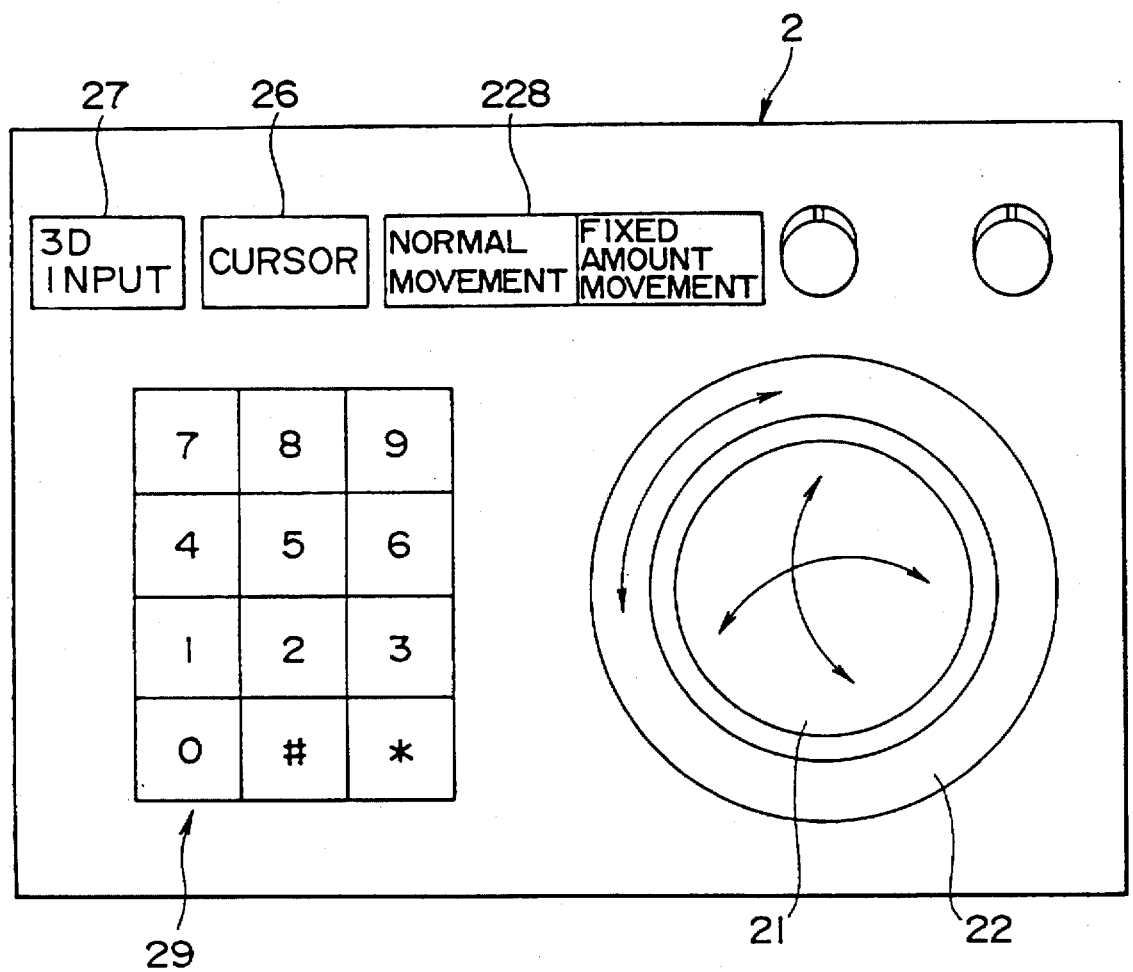
Figure 17A:
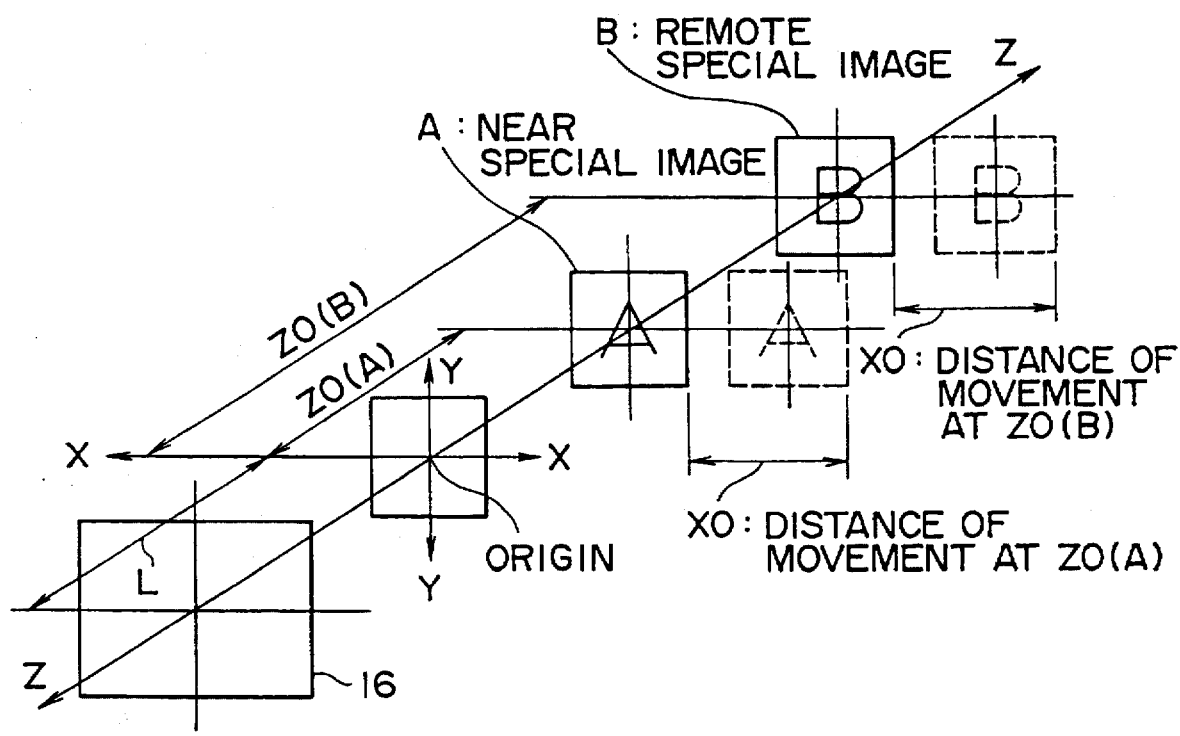
Figure 17B:
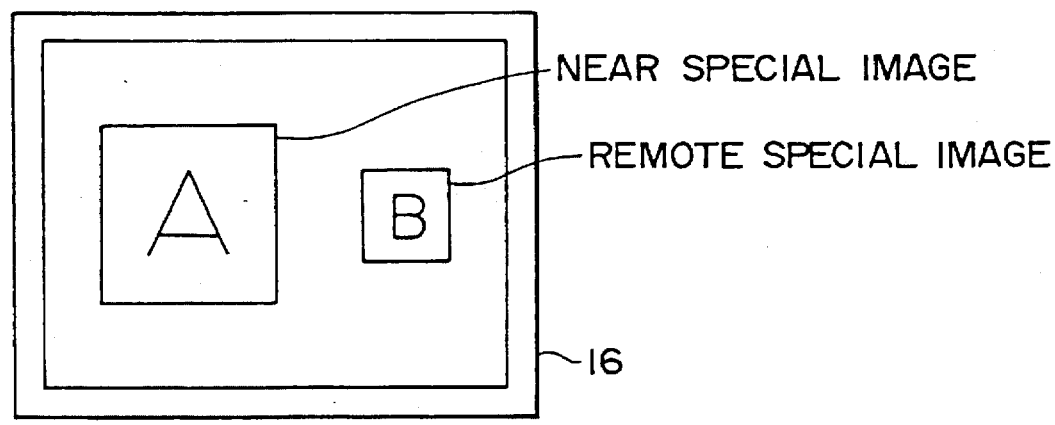
Figure 18A:
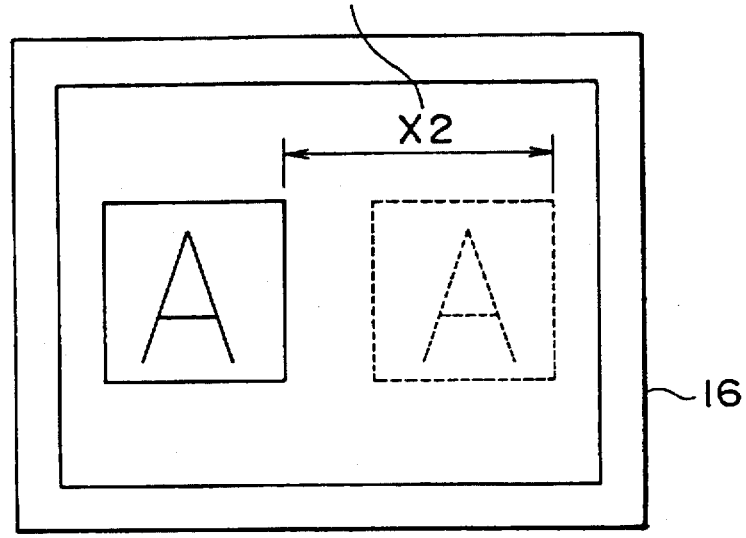
Figure 18B:
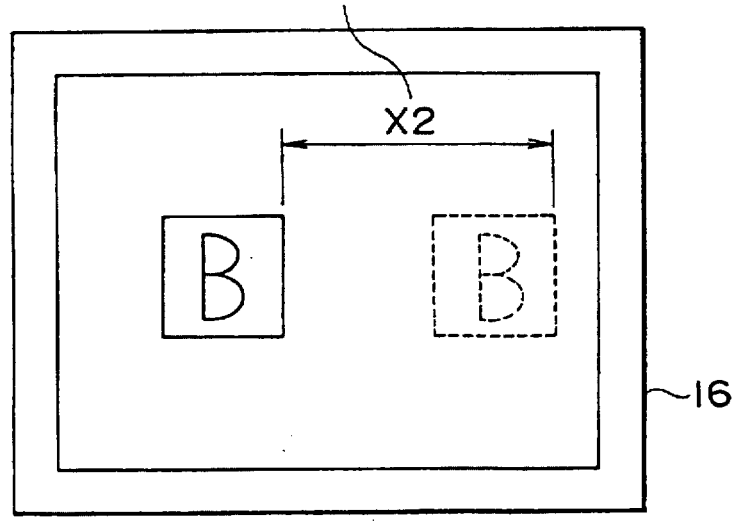
Figure 19A:
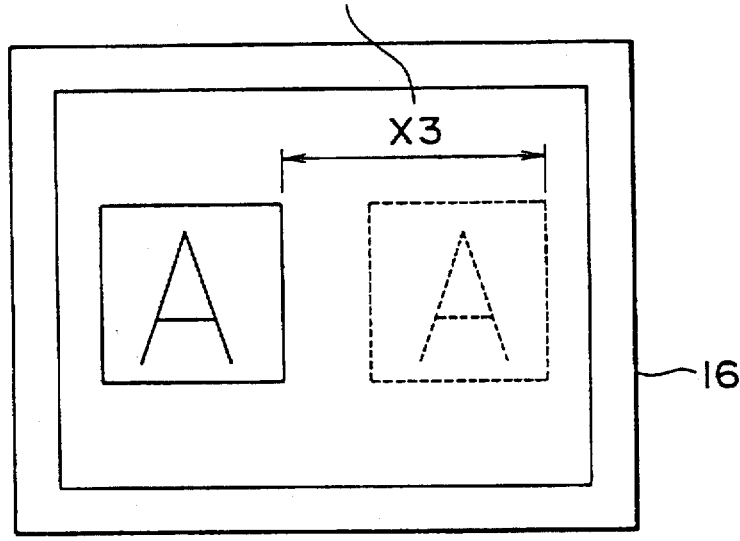
Figure 19B:
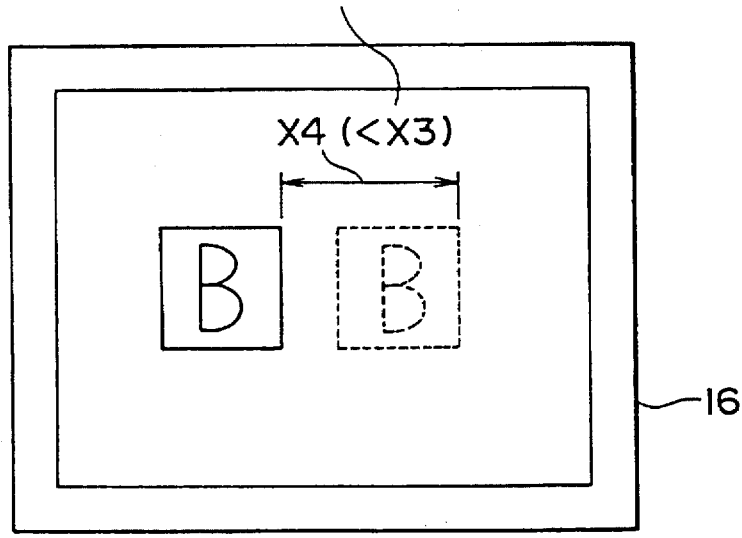
Figure 20:
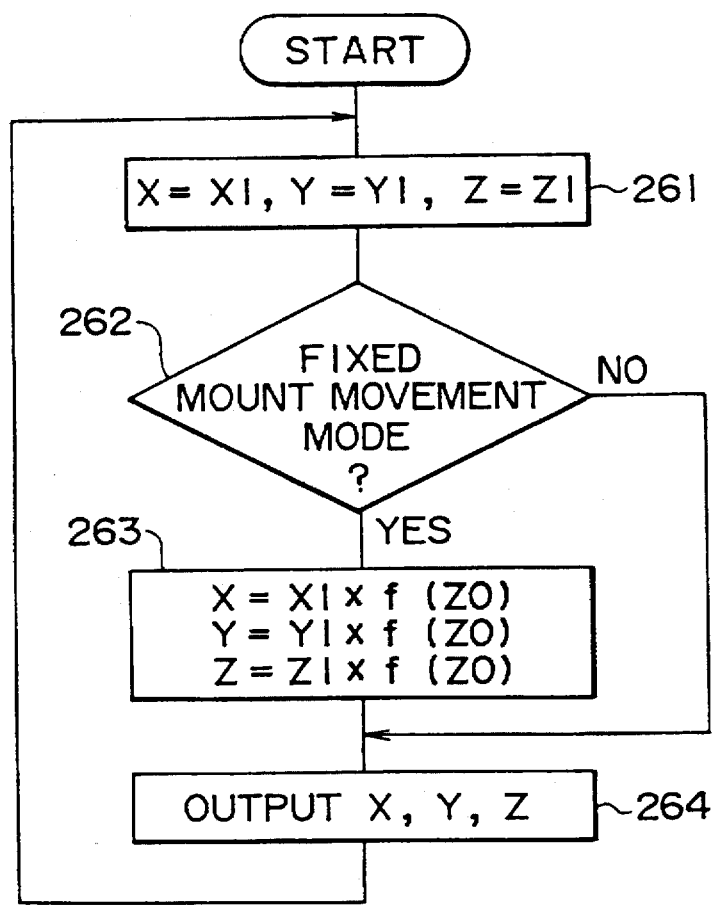
Figure 21:
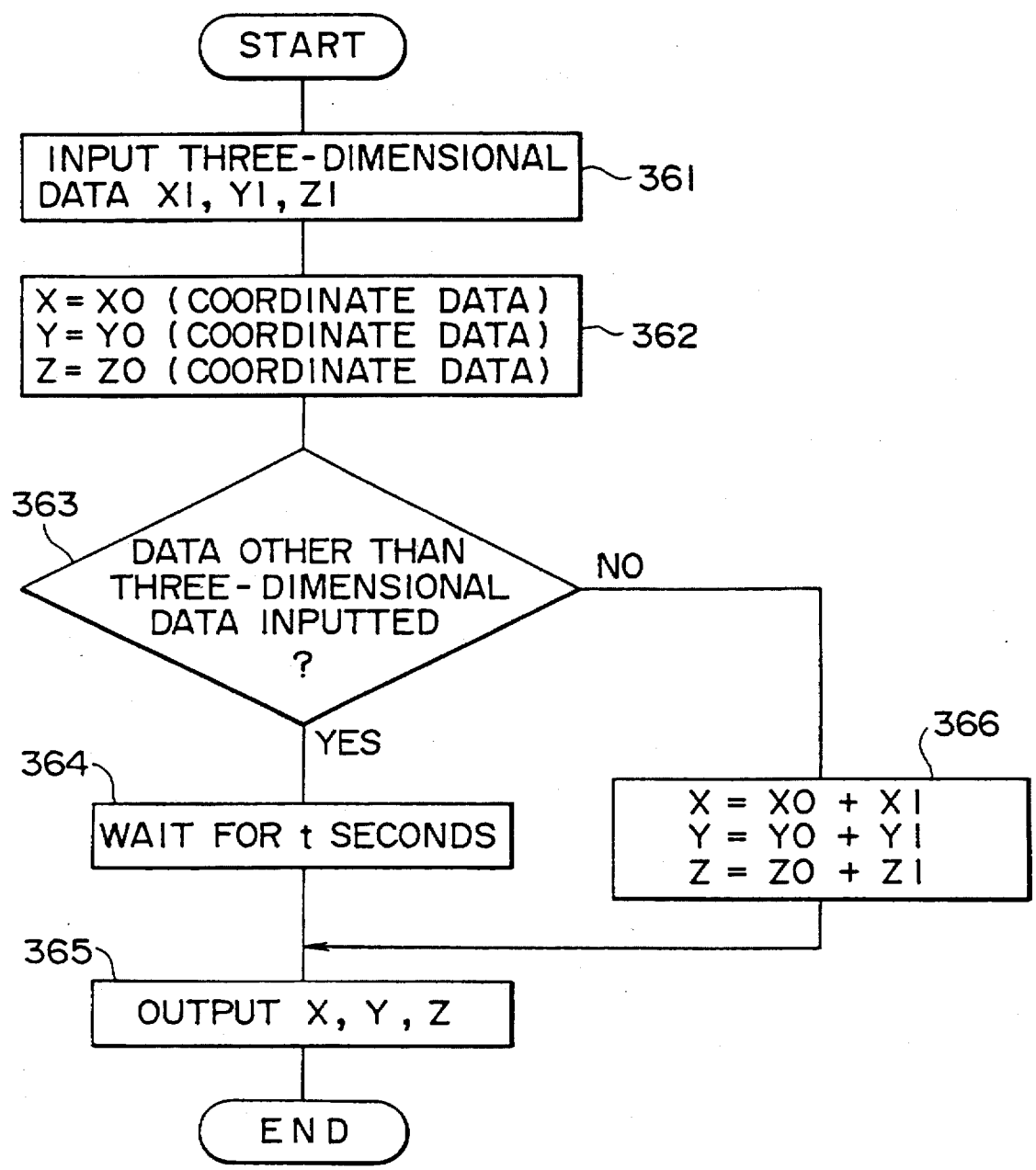

PIG. 11 is a flow chart illustrating a data outputting procedure of the three-dimensional image special effect apparatus of FIG. 1;

FIG. 12 is a block diagram showing another three-dimensional image special effect apparatus to which the present invention is applied;

FIG. 13 is a schematic view showing a panel of the three-dimensional image special effect apparatus of FIG. 12;

FIG. 14 is a flow chart illustrating a data outputting procedure in an X or Y mode of the three-dimensional image special effect apparatus of FIG. 12;

FIG. 15 is a block diagram showing a further three-dimensional image special effect apparatus to which the present invention is applied;

FIG. 16 is a schematic view showing a panel of the three-dimensional image special effect apparatus of FIG. 15;

FIG. 17A is a diagrammatic view illustrating a distance in a depthwise direction on a screen of a monitor of the three-dimensional image special effect apparatus of FIG. 15;

FIG. 17B is a schematic view illustrating a size on the screen of the monitor of the three-dimensional image special effect apparatus of FIG. 15;

FIGS. 18A and 18B are diagrammatic views illustrating distances of movement with respect to same input data in a fixed movement mode of the three-dimensional image special effect apparatus of FIG. 15;

FIGS. 19A and 19B are diagrammatic views illustrating distances of movement with respect to same input data in a normal movement mode of the three-dimensional image special effect apparatus of FIG. 15;

FIG. 20 is a flow chart illustrating an input data modification procedure of the three-dimensional image special effect apparatus of FIG. 15; and FIG. 21 is a flow chart illustrating a three-dimensional data outputting procedure of the three-dimensional image special effect apparatus of FIG. 15.

DETAILED DESCRIPTION OF THE PREFERRED EMBODIMENTS

Referring first to FIG. 1, there is shown a three-dimensional image special effect apparatus to which the present invention is applied. The three-dimensional image special effect apparatus is generally denoted at 1 and includes a CPU (central processing unit) 11, and a three-dimensional and parameter inputting section 13, a graphic display production section 14 and an image special effect processing section 15 all connected to the CPU 11 by way of a bus 12. A video signal supplied from the outside is processed by the image special effect processing section 15 so that a special effect may be applied to the same. The output video signal of the image special effect processing section 15 is supplied to an image monitor 16 so that the video image to which the special effect has been provided is displayed on the screen of the image monitor 16.

Various operations for moving, rotating, expanding or contracting the special image displayed on the image monitor 16 are performed by way of the three-dimensional and parameter inputting section 13. The three-dimensional and parameter inputting section 13 includes, as data inputting means, a track ball 21 in the form of a ball rotatable in an arbitrary direction and a rotary ring 22 disposed on an outer periphery of the track ball 21 and rotatable in a circumferential direction.

The amount of rotation of the track ball 21 is detected by an X counter 23 and a Y counter 24 while the amount of rotation of the rotary ring 22 is detected by a Z counter 25. Further, the three-dimensional and parameter inputting section 13 includes a cursor switch 26 for establishing a condition wherein a parameter for determining a condition of a special image which will be hereinafter described can be set, a three-dimensional inputting switch 27 for enabling operation of a special image, a motion holding switch 28 for setting a motion holding mode in which motion of a special image is held as hereinafter described, and data inputting switches 29 for inputting various data.

Figure 2:
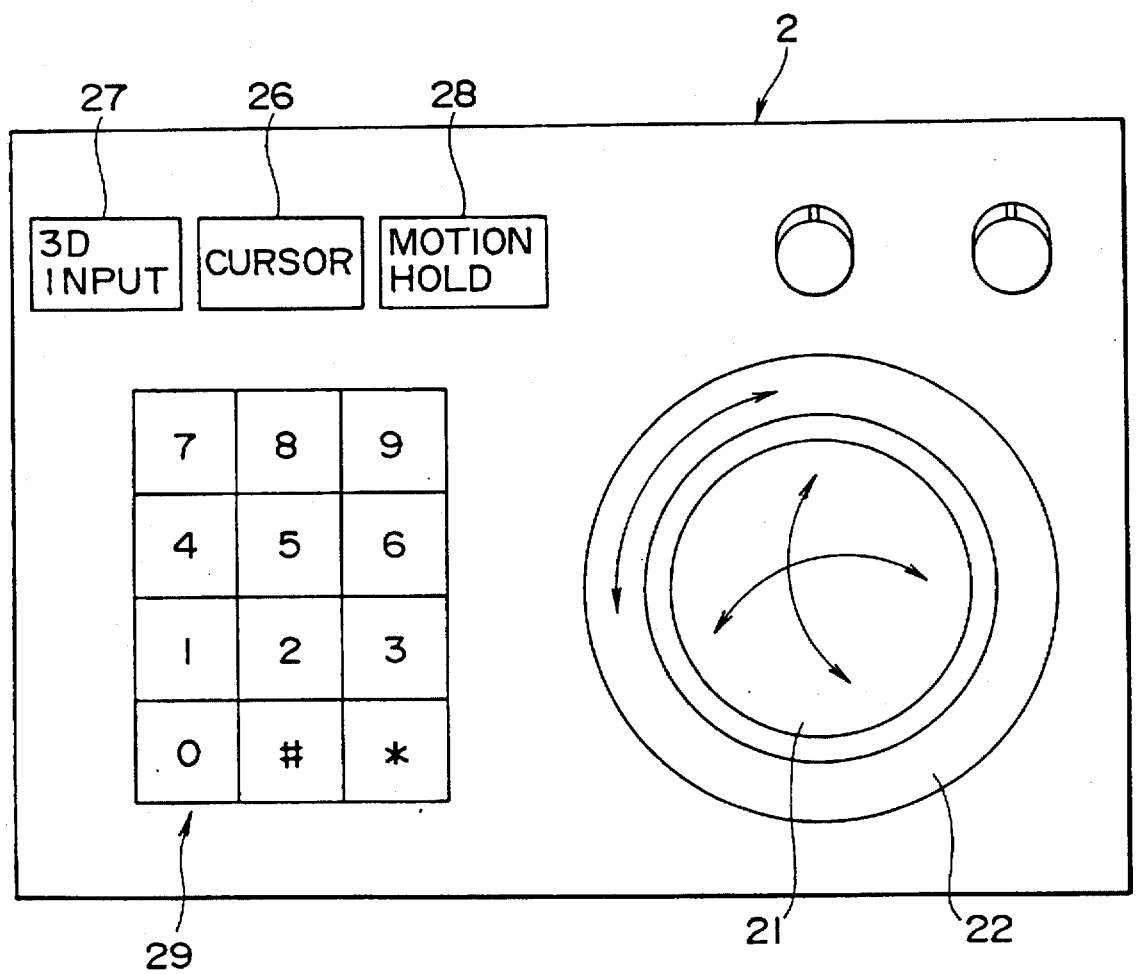
FIG. 2 is a schematic view showing a panel of the three-dimensional image special effect apparatus of FIG. 1.

The track ball 21, rotary ring 22, cursor switch 26, three-dimensional inputting switch 27, motion holding switch 28 and data inputting switches 29 are mounted on such a panel 2 as shown in FIG. 2.

Referring to FIG. 1, parameters for determining conditions of a special image are displayed by way of various menus produced by the graphic display production section 14. A selected one of the menus is supplied to a menu monitor 17 and displayed on the screen of the menu monitor 17. Then, when values of necessary parameters are set by way of the track ball 21 and the rotary ring 22 as hereinafter described, they are fetched by the CPU 11, and the image special effect processing section 15 is controlled by an instruction from the CPU 11 to determine conditions of the special image.

Figure 3:
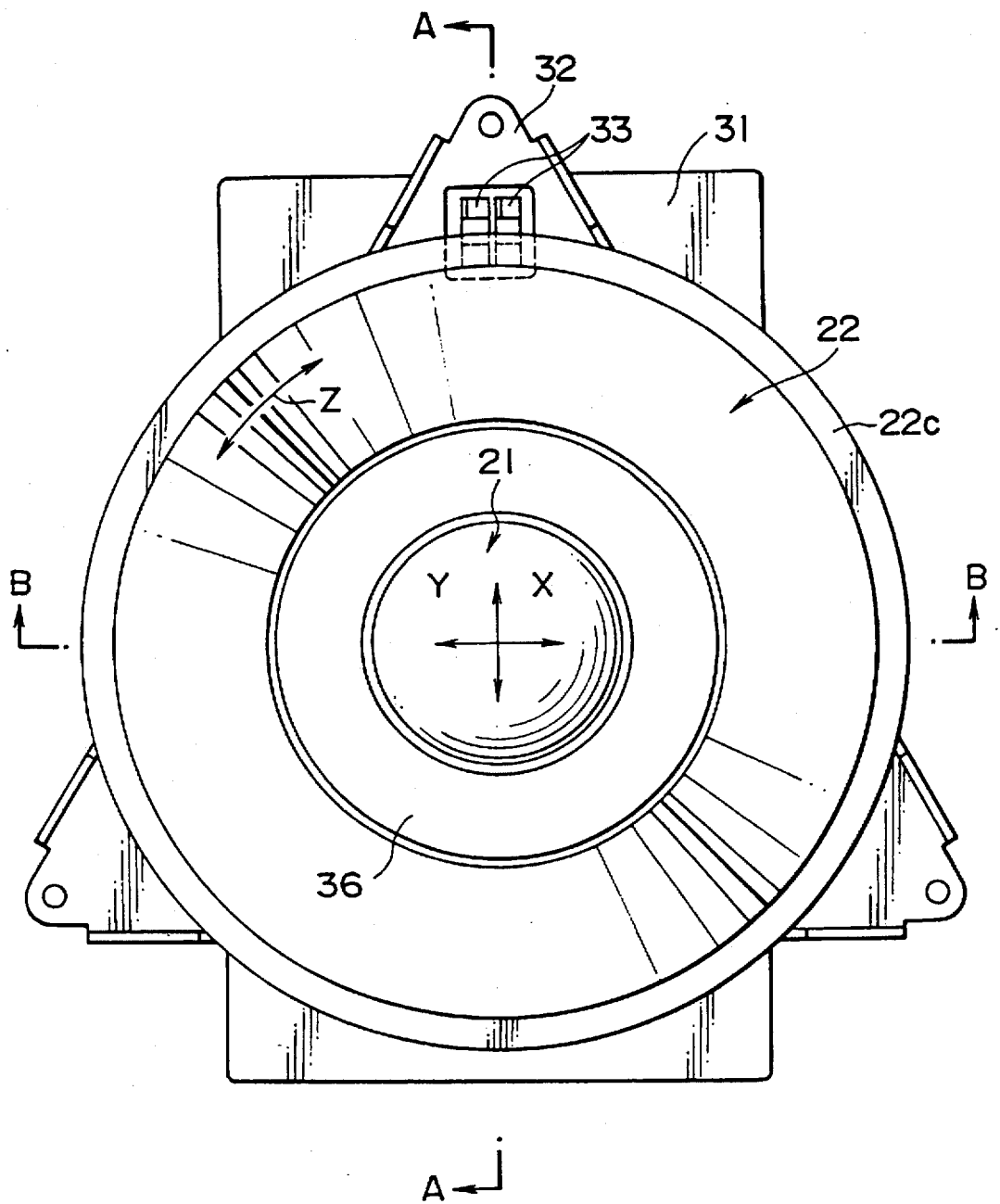
FIG. 3 is a plan view of a track ball and a rotary ring of the three-dimensional image special effect apparatus of FIG. 1.

FIG. 3 shows a detailed construction of the track ball 21 and the rotary ring 22. Referring to FIG. 3, the track ball 21 and the rotary ring 22 are mounted for individual rotation on a base chassis 32 disposed on a printed circuit board 31. The track ball 21 is rotatable in any direction while the rotary ring 22 is rotatable in a circumferential direction around the track ball 21. The track ball 21 can input two-dimensional data corresponding to, for example, an X axis and a Y axis of a three-dimensional coordinate system while the rotary ring 22 can input data corresponding to a Z axis of such three-dimensional coordinate system.

Figure 4:
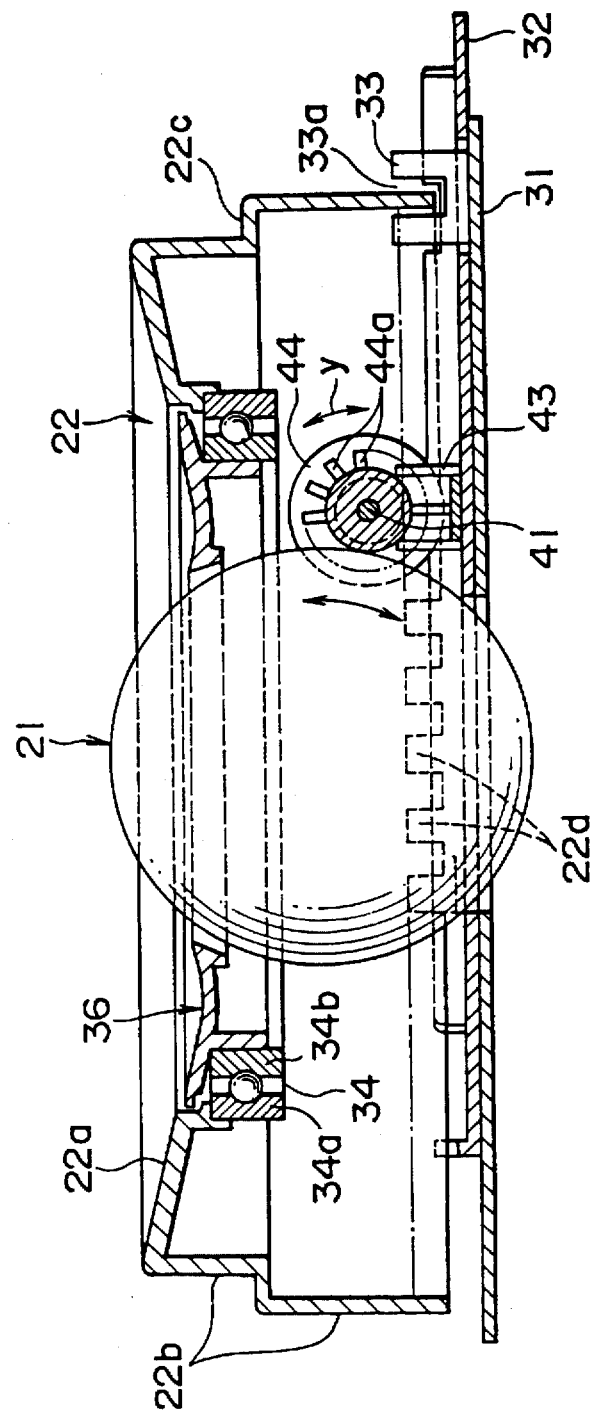
FIG. 4 is a sectional view taken along line A—A of FIG. 3 showing the track ball and the rotary ring.
Figure 5:
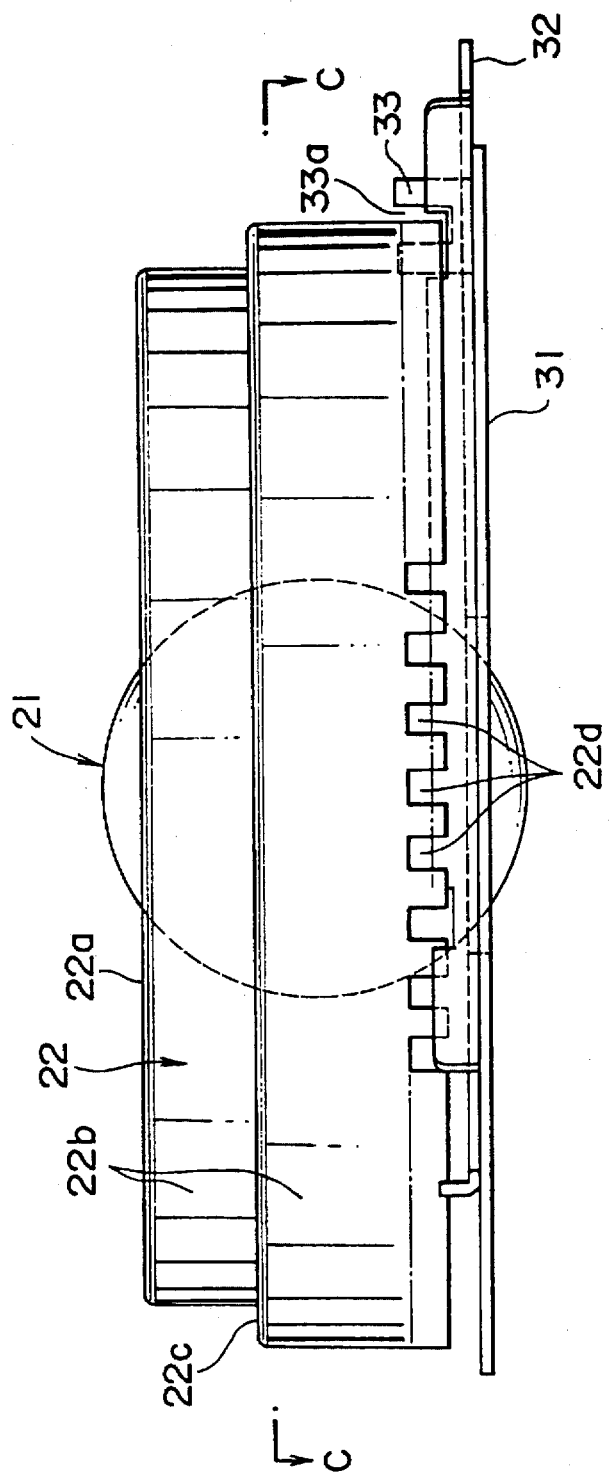
FIG. 5 is a side elevational view of the track ball and the rotary ring shown in FIG. 3.

Referring to FIG. 4, the rotary ring 22 is formed in an annular shape from a plate member of a uniform thickness and has a conically inclined upper face portion 22a and a flange portion 22b provided at the top thereof. A large number of slits 22d having a predetermined width are provided in an equidistantly spaced relationship from each other at a lower end of the flange portion 22b over the entire circumference as also shown in FIG. 5. The slits 22d are disposed across a light passage portion 33a in the form of a groove of a photo-interrupter 33 mounted on the base chassis 32.

Figure 6:
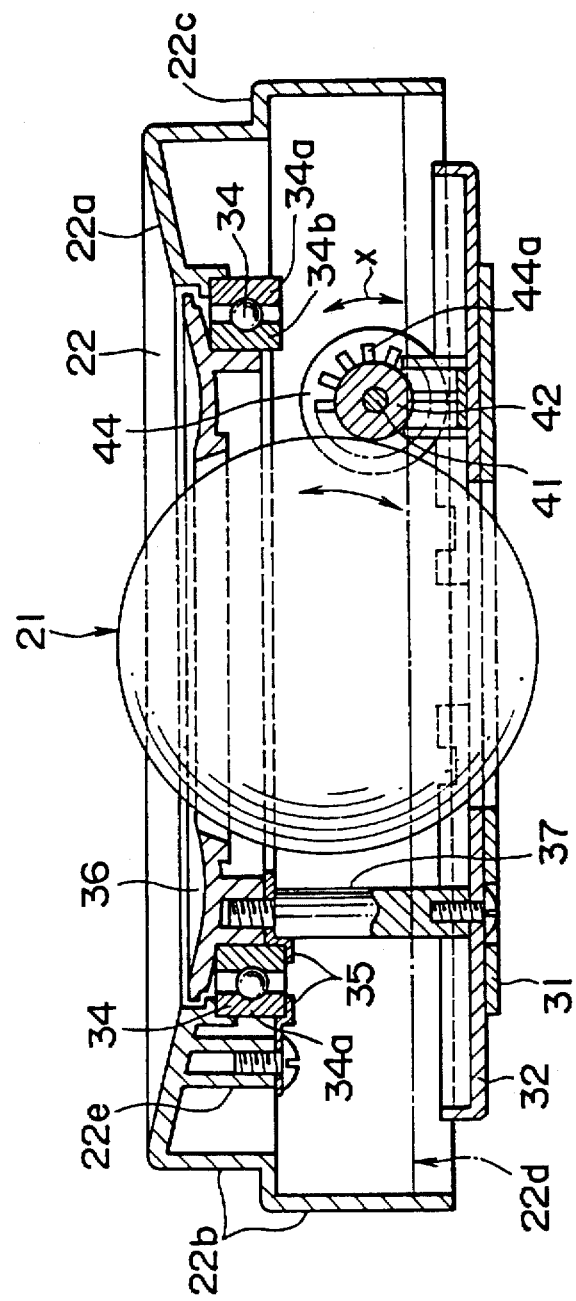
FIG. 6 is a sectional view taken along line B—B of FIG. 3 showing the track ball and the rotary ring.

A bearing 34 is disposed at an end face of an inner circumference of the upper face portion 22a of the rotary ring 22, and a plurality of threaded portions 22e are provided in the upper face portion 22a of the bearing 34 as shown in FIG. 6. An end of a stopper metal element 35 is held in contact with a lower end face of the bearing 34 and is secured there by means of the threaded portions 2e thereby to secure the rotary ring 22 to an outer race portion 34a of the bearing 34.

A fixing ring 36 is disposed on an inner circumferential face of the rotary ring 22. The fixing ring 36 is supported by a stand pin 37 implanted on the base chassis 32. An inner race portion 34b of the bearing 34 is force fitted on an outer circumferential face of the fixing ring 36 to secure the bearing 34. Consequently, the rotary ring 22 is supported so that it can be rotated by a weak force in its circumferential direction, that is, in a direction corresponding to the Z axis.

Figure 7:
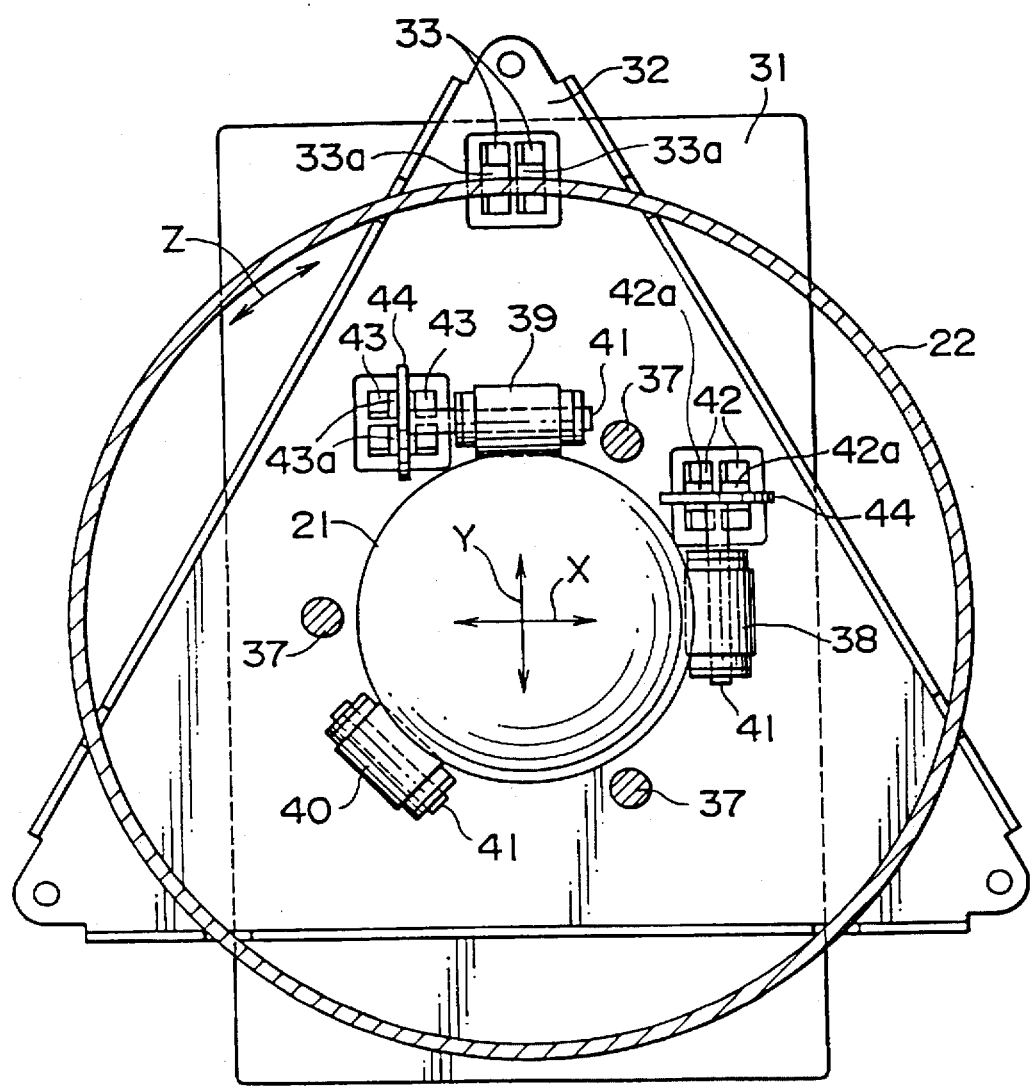
FIG. 7 is a sectional view taken along line C—C of FIG. 5 showing the track ball and the rotary ring.

Meanwhile, the track ball 21 is disposed on the inner circumference side of the fixing ring 36 and is supported at three points by three cylindrical support rollers 38, 39 and 40 mounted on the base chassis 32 as shown in FIG. 7. An upper portion of the track ball 21 projects upwardly like a dome from the top end face of the fixing ring 36 as shown in FIG. 6 so that the projecting portion of the track ball 21 can be manually operated from the outside.

Each of the cylindrical support rollers 38, 39 and 40 has a center shaft 41 supported for rotation around its axis, and the support roller 38 is disposed to extend perpendicularly to the X-axis direction in FIG. 7. The support roller 39 is disposed to extend perpendicularly to the Y-axis direction perpendicular to the X-axis direction. Accordingly, if the track ball 21 is manually operated by a finger to rotate, the support rollers 38 and 39 also are rotated in accordance with a direction and an amount of such rotation.

A method of detecting amounts of rotation of the track ball 21 and the rotary ring 22 will be described subsequently. The photo-interrupters 33 are used for detection of rotation of the rotary ring 22, that is, rotation in the Z direction as mentioned hereinabove. Each photo-interrupter 33 includes a light emitting element and a light receiving element (not shown) disposed in an opposing relationship to each other on the printed circuit board 31 so that the light passage portion 33a in the form of a groove may be defined between them as seen from FIG. 4.

When the rotary ring 22 is rotated and the slits 22d thereof cross the light passage portion 33a, a pulse-like electric signal is outputted from each photo-interrupter 33. The number of such pulses is counted by the Z counter 25 (FIG. 1) to detect an amount of rotation of the rotary ring 22. The phase difference between the outputs of the pair of photo-interrupters 33 indicates the direction of rotation. See U.S. Pat. No. 5,313,229 for an explanation of the operation of conventional track balls.

Meanwhile, amounts of rotation of the track ball 21 in the X direction and the Y direction are detected by pairs of photo-interrupters 42 and 43, respectively, as seen from FIG. 6 or 4. The pairs of photo-interrupters 42 and 43 are constructed in a similar manner as the photo-interrupter 33 described above, and each includes a light emitting element and a light receiving element (not shown) disposed in an opposing relationship to each other so as to form a light passage portion 42a or 43a as seen in FIG. 7.

When the cylindrical support roller 38 or 39 is rotated, radial slits 44a of a shutter plate 44 in the form of a disk mounted on the cylindrical support roller 38 or 39 cross the light passage portion 42a or 43a, whereupon each photo-interrupter 42 or 43 outputs an electric signal in the form of pulses. Such pulse signal is counted by the X counter 23 or the Y counter 24 to detect an amount of rotation of the track ball 21 in the X direction or the Y direction. Again, the phase difference between the outputs of photo-interrputers of each of the pairs of photo-interrupters 42, 43 indicates the direction of rotation.

Referring back to FIG. 1, outputs of the X counter 23, Y counter 24 and Z counter 25 are fetched by the CPU 11 by way of the bus 12. Then, the image special effect processing section 15 is controlled in accordance with an instruction from the CPU 11 so that a special image on the image monitor 16 is operated in three-dimensional directions.

Before a special image is manually operated by way of the track ball 21 or the rotary ring 22, the three-dimensional inputting switch 27 will be turned on. Consequently, the track ball 21 and the rotary ring 22 thereafter serve as operation means for operating a special image. Normally, the motion holding switch 28 is held in an off-state so that the three-dimensional image special effect apparatus 1 is in a normal mode, and in the normal mode, a special image is moved in response to movements of the track ball 21 and the rotary ring 22. Accordingly, when it is tried to move a special image a comparatively short distance, the normal mode is used.

In contrast, when it is tried to move a special image a long distance, the motion holding switch 28 is kept depressed to keep the motion holding mode, and in this condition, the track ball 21 or the rotary ring 22 will be manually operated. Consequently, only by manually operating the track ball 21 or the rotary ring 22 once, a special image can be moved continuously as described below.

Figure 8:
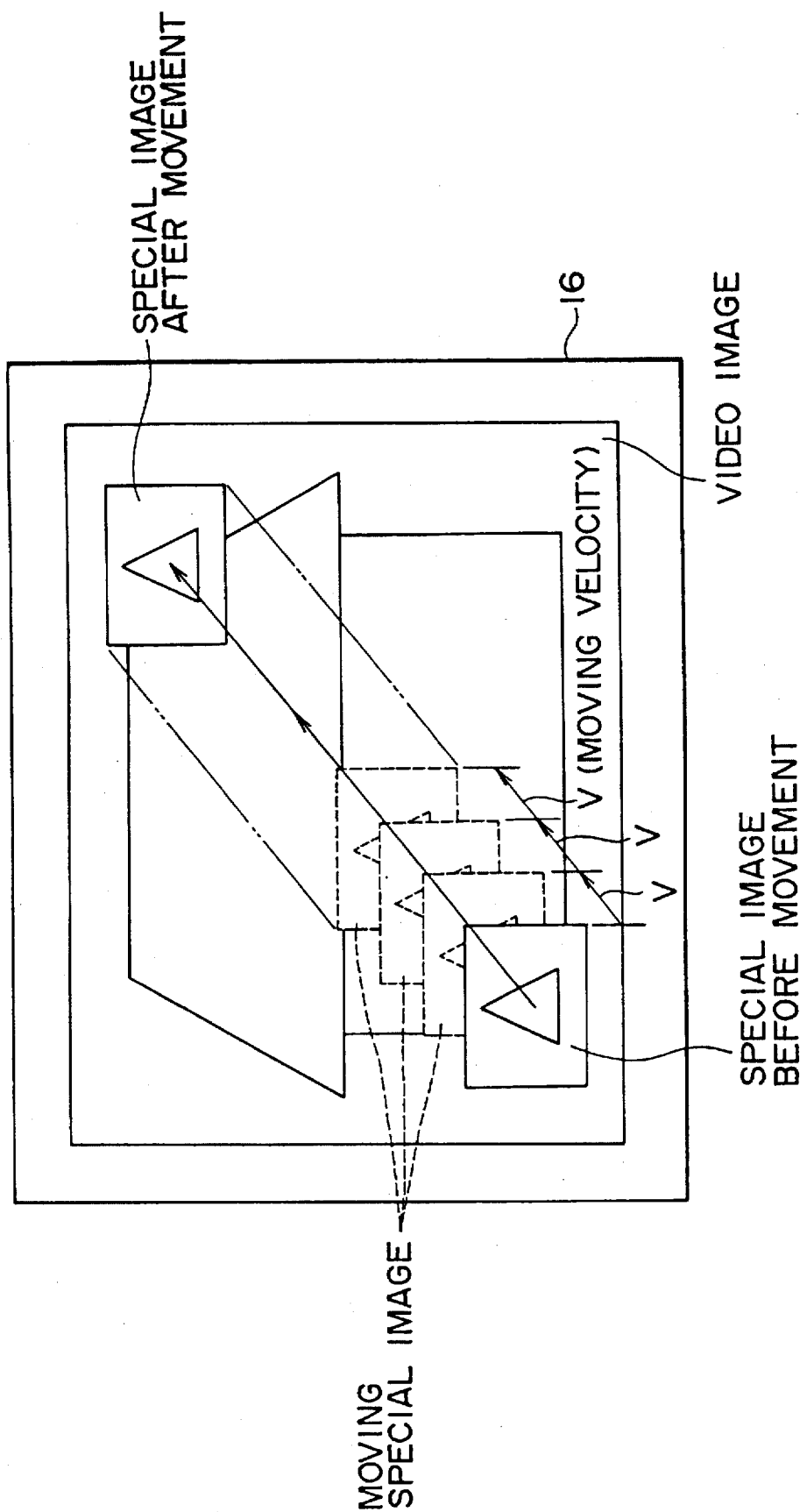
FIG. 8 is a diagrammatic view illustrating motion of a special image on a monitor of the three-dimensional image special effect apparatus of FIG. 1 when the three-dimensional image special effect apparatus is in a motion holding mode.

In particular, in this instance, first count values of the X counter 23, the Y counter 24 and the Z counter 25 are held by the CPU 11 and are successively supplied to the image special effect processing section 15. Accordingly, if the track ball 21 or the rotary ring 22 is first operated manually for a fixed period of time, then, for example, a special image fitted in a video image as shown in FIG. 8 moves at a predetermined speed V in a predetermined direction in response to an amount of rotation of the track ball 21 or the rotary ring 22. Then, the special image thereafter continues to move with the same vector until the track ball 21 or the rotary ring 22 is manually operated subsequently.

Then, when the special image comes near to a destination position, the motion holding switch 28 will be released to put the three-dimensional image special effect apparatus 1 into the normal mode. Consequently, the movement of the special image stops. Thereafter, the special image can be moved accurately to the destination position while finely adjusting the same using the track ball 21 or the rotary ring 22.

Figure 9A:
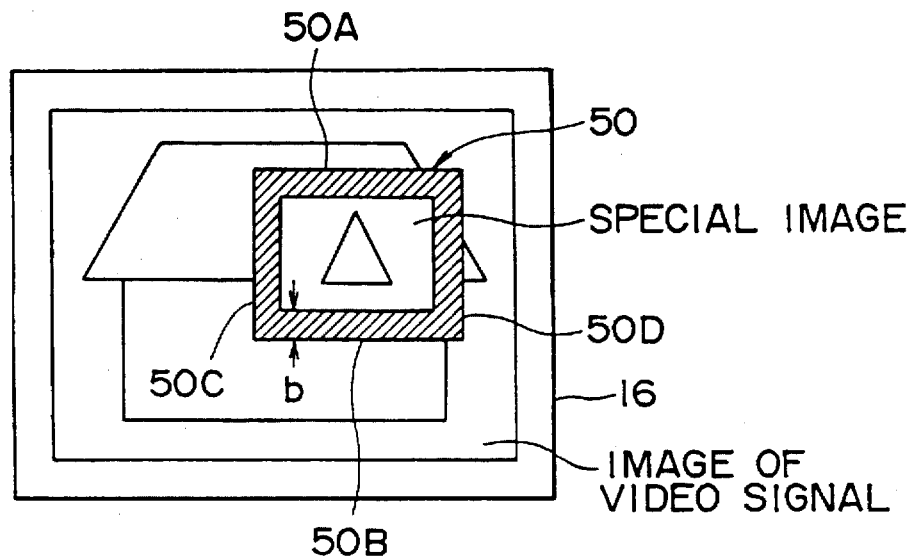
FIG. 9A is a schematic view showing an example of a display of data on the monitor of the three-dimensional image special effect apparatus of FIG. 1.
Figure 9B:
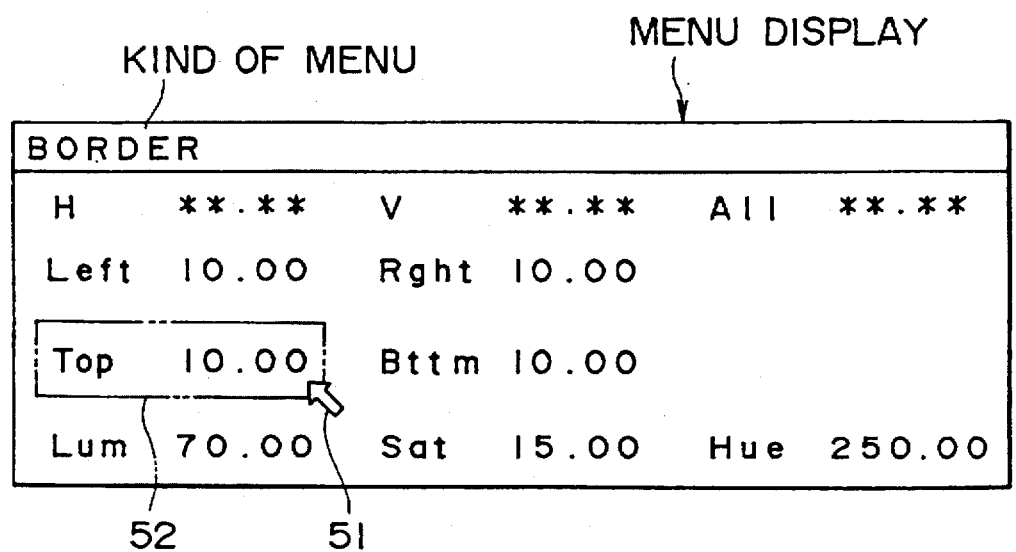
FIG. 9B is a schematic view showing a display of a data setting menu on the monitor of the three-dimensional image special effect apparatus of FIG. 1.

Parameters for determining a condition of a special image produced by the image special effect processing section 15 such as the size of the special image and a dimension and a color of such a border (contour) 50 as shown in FIG. 9A are produced by the graphic display production section 14 as described above and are displayed as various menus on the menu monitor 17. FIG. 9B shows an exemplary one of menu displays for setting a border.

Referring to FIG. 9B, in the menu shown, "All" is provided as a parameter for determining the overall width b of the border 50; "H" is provided as a parameter of the width b of upper and lower borders 50A and 50B; "V" is provided as a parameter for left and right borders 50C and 50D; and "Left", "Rght" (right), "Top" and "Bttm" (bottom) are provided as parameters for the individual borders 50A to 50D. Further, the color of the border 50 can be changed entirely, and "Lum" (luminarice), "Sat" (saturation) and "Hue" for determining the luminance, the saturation and the hue, respectively, are provided as parameters for the color of the border 50.

In order to set the parameters described above, the cursor switch 26 shown in FIGS. 1 and 2 will be depressed. Consequently, a cursor 51 in the form of, for example, an arrow mark is displayed on the menu display of FIG. 9B thereby to allow subsequent setting of the parameter. Thus, the track ball 21 serves as cursor movement means while the rotary ring 22 serves as parameter setting means.

Referring particularly to FIG. 9B, the parameter "Top" for the upper border 50A is set to 10.00 mm, and consequently, the width b of the upper border 50A is displayed to be 10 mm. When it is intended to modify the value, for example, to 20 mm, the track ball 21 will be rotated to move the cursor 51 into a parameter display area 52. This establishes a condition wherein the value 10.00 of the parameter "Top" can be changed.

The rotary ring 22 will be rotated in this condition. Upon such rotation, the value of the parameter successively increases or decreases. Therefore, the manual operation of the rotary ring 22 will be stopped where the value of the parameter becomes equal to 20.00, and the cursor 51 will be moved outside the range of the parameter display area 52. As a result, the value of the parameter "Top" is set to 20.00. Then, the width b of the upper border 50A is displayed to be 20 mm.

It is to be noted that, while in the present embodiment the value of a parameter can be changed when the cursor 51 is in the parameter display area 52 and then set when the cursor 51 is moved outside the parameter display area 52, it is otherwise possible to provide, for example, a select switch not shown separately so that a condition wherein a parameter can be changed is entered or the value of the parameter is set in response to operation of the select switch.

When it is intended to operate a special image after the parameters have been set in this manner, the three-dimensional inputting switch 27 will be turned on. Consequently, the track ball 21 and the rotary ring 22 thereafter serve as three-dimensional inputting means and can operate a special image on the image monitor 16.

Figure 10:
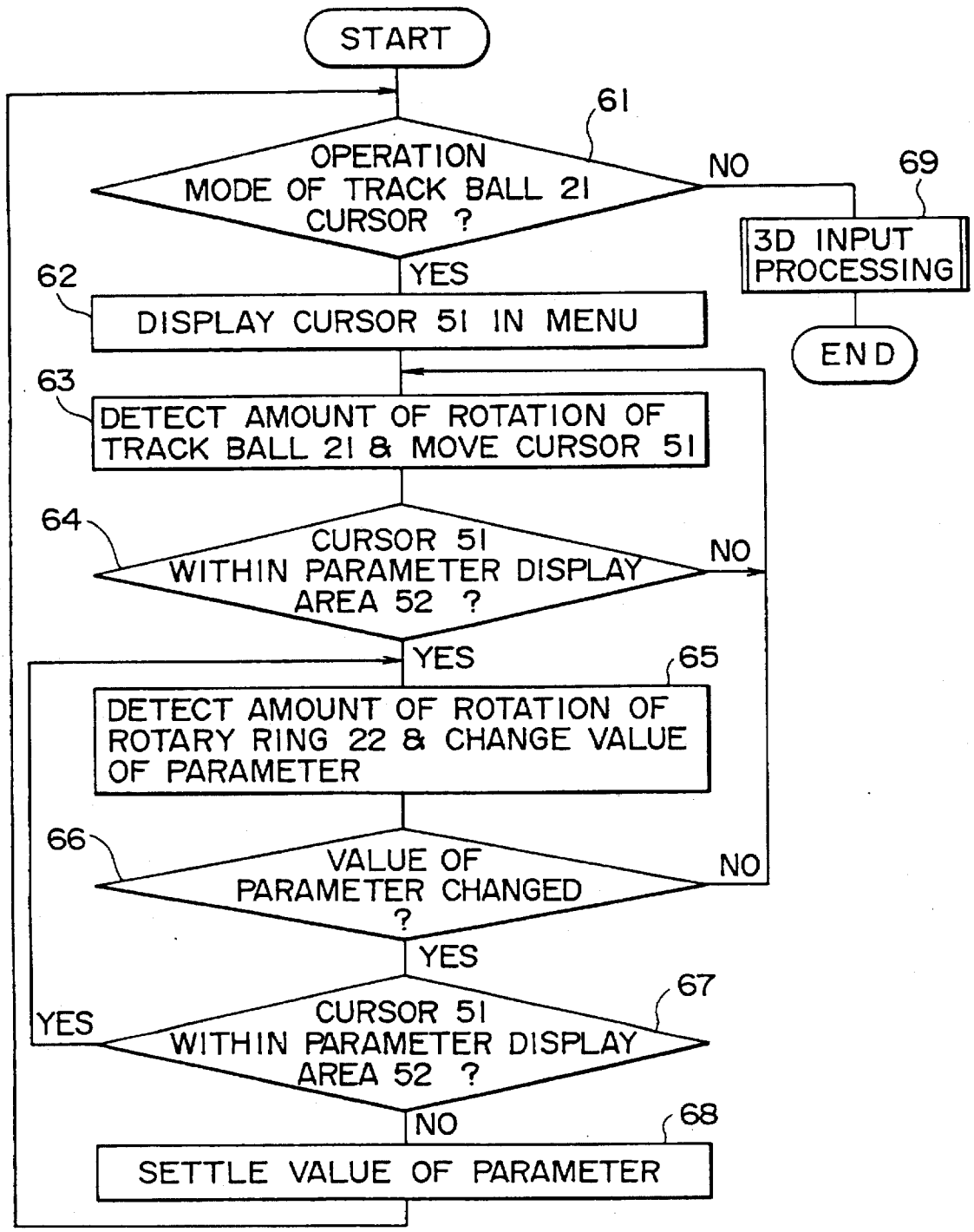
FIG. 10 is a flow chart illustrating a data inputting procedure of the three-dimensional image special effect apparatus of FIG. 1.

FIG. 10 illustrates a procedure of data inputting processing 60 by the three-dimensional image special effect apparatus 1. Referring to FIG. 10, in the data inputting processing 60 illustrated, it is determined first at step 61 whether or not the operation mode of the track ball 21 is a cursor mode. The determination is based on whether or not the cursor switch 26 is in an on-state. In the case of a cursor mode, the cursor 51 is displayed on the menu at step 62.

Then, when the track ball 21 is manually operated, amounts of rotation of the track ball 21 in the X and Y directions are detected, and the cursor 51 is moved in accordance with the thus detected amounts of rotation at step 63. Then, it is determined at step 64 whether or not the cursor 51 enters the parameter display area 52. When the cursor 51 does not enter the parameter display area 52, the cursor 51 is further moved in accordance with subsequently detected amounts of rotation of the track ball 21 at step 63.

Then, if it is detected at step 64 that the cursor 51 finally enters the parameter display area 52, then an amount of rotation of the rotary ring 22 is detected, and the value of the parameter is modified in accordance with the thus detected amount of rotation at step 65. Then, it is determined at step 66 whether or not the value of the parameter exhibits a change, and if no change is detected, then amounts of rotation of the track ball 21 are detected at step 63 to move the cursor 51. Thereafter, similar processing to that described above is repeated.

If it is determined at step 66 that the value of the parameter exhibits a change, then it is determined subsequently at step 67 whether or not the cursor 51 is within the parameter display area 52. Here, if it is determined that the cursor 51 is within the parameter display area 52, amounts of rotation of the rotary ring 22 are detected at step 65 to modify the value of the parameter, and thereafter, such processing as described above is repeated.

Then, if it is determined at step 67 that the cursor 51 has gone out of the parameter display area 52, the value of the parameter is settled at step 68. One parameter is settled in this manner. If it is intended to set another parameter, then the cursor switch 26 is kept on, and consequently, it is discriminated at step 61 that the operation mode of the track ball 21 is a cursor mode. Accordingly, similar processing to that described above is performed.

After setting processing for necessary parameters is completed in this manner, the three-dimensional inputting switch 27 will be turned on subsequently. Consequently, it is subsequently determined at step 61 that the operation mode of the track ball 21 is not a cursor mode but is a three-dimensional inputting mode, and three-dimensional inputting processing is performed subsequently at step 69 by manually operating the track ball 21 and the rotary ring 22, thereby completing the data inputting processing 60.

As described above, the three-dimensional image special effect apparatus of the present embodiment allows movement of a parameter setting cursor by means of a track ball which is provided for manually operating a special image in two-dimensional directions, and further allows setting of a parameter by means of a rotary ring disposed on an outer periphery of the track ball for manually operating the special image in a third three-dimensional direction.

Accordingly, with the three-dimensional image special effect apparatus of the present embodiment, all parameters can be set by manually operating the track ball and the rotary ring by one hand, and consequently, it is advantageous in that an improved operability is assured.

Figure 11:
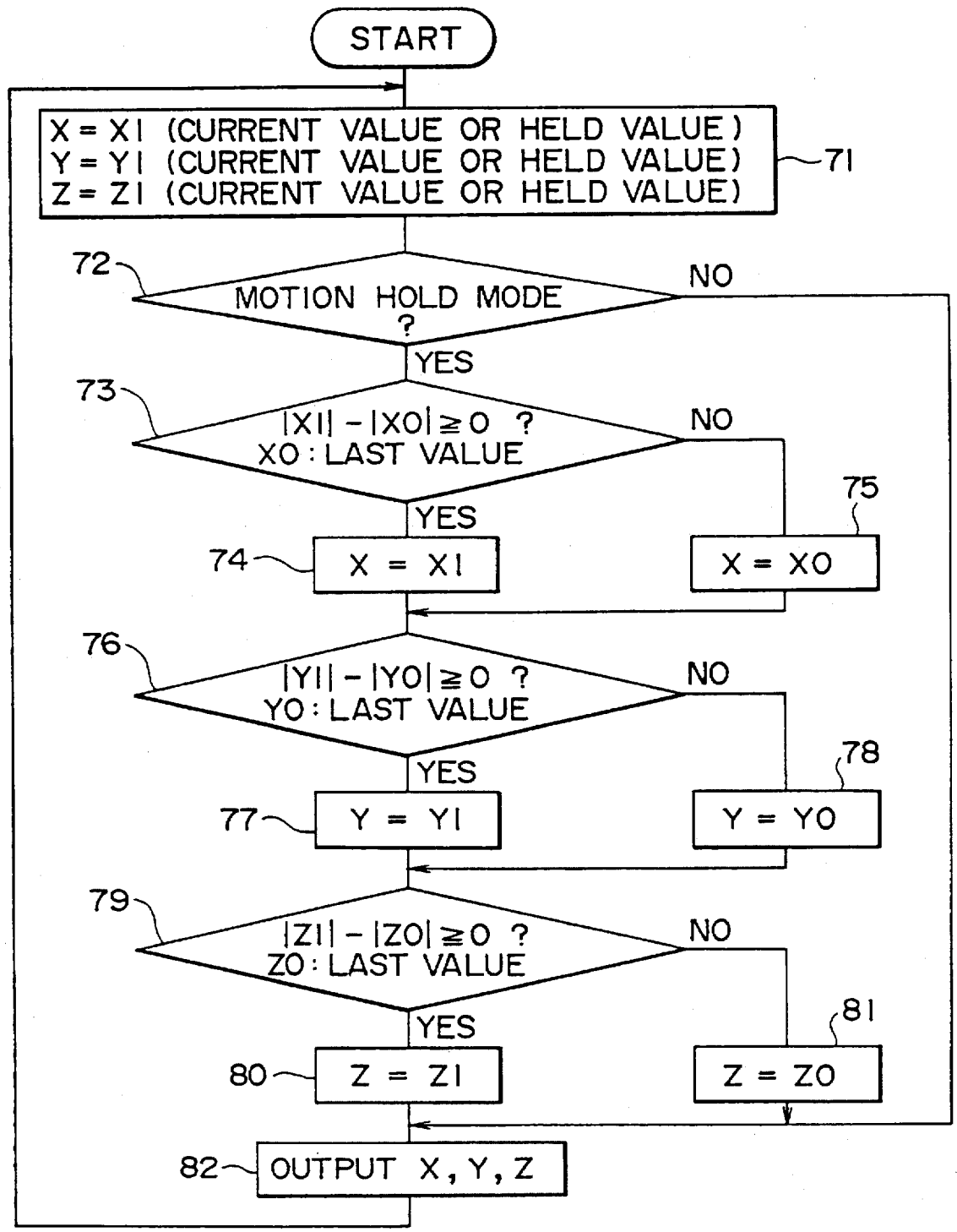

FIG. 11 illustrates a procedure of data outputting processing 70 of the three-dimensional image special effect apparatus. Referring to FIG. 11, in the data outputting processing 70 illustrated, current count values X1, Y1 and Z1 of the counters 23, 24 and 25 are placed first at step 71 as output data X of the X counter 23, output data Y of the Y counter 24 and output data Z of the Z counter 25, respectively.

Subsequently, it is determined at step 72 whether or not a motion holding mode is set, and if it is determined at step 72 that a motion holding mode is set, an absolute value of the current count value X1 of the X counter 23 is compared with an absolute value of the last count value X0 at step 73. Then, if the absolute value of the current count value X1 is equal to or higher than the absolute value of the last count value X0, the current value X1 is left as it is as output data X at step 74. On the contrary when the absolute value of the last value X0 is higher, the output data X are replaced by the last data X0 at step 75.

Subsequently to step 74 or 75, an absolute value of a current value Y1 of the Y counter 24 is compared with an absolute value of a last value Y0 at step 75, and when the absolute value of the current value Y1 is equal to or higher than the absolute value of the last value Y0, the current value Y1 is left as it is as output data Y at step 77, but on the contrary when the absolute value of the last value Y0 is higher, the output data Y are replaced by the last value Y0 at step 78.

Subsequently to step 77 or 78, an absolute value of a current value Z1 of the Z counter 25 is compared with an absolute value of a last value Z0 at step 79, and when the absolute value of the current value Z1 is equal to or higher than the absolute value of the last value Z0, the current value Z1 is placed as output data Z at step 80, but on the contrary when the absolute value of the last value Z0 is higher, the output data Z are replaced by the last value Z0 at step 81.

The output data X, Y and Z determined in this manner are outputted at step 82. The output data are supplied to the image special effect processing section 15, and the special image is operated in accordance with the data. Then, a current value or a held value is placed as each of the output data X, Y and Z at step 61. When the track ball 21 and/or the rotary ring 22 are manually operated, amounts of rotation of them are placed as current values X1, Y1 and Z1, but when neither the track ball 21 nor the rotary ring 22 is manually operated, the respective held values are placed as the output data X, Y and Z. Thereafter, processing similar to that described above is repeated. The sequence of steps described above is performed repetitively, for example, for each one field (in the case of 60 Hz, for each 16 ms).

In the three-dimensional image special effect apparatus of the present embodiment, if the track ball 21 or the rotary ring 22 is manually operated once while the motion holding switch 28 is kept depressed, then while the motion holding switch 28 is kept depressed, a special image moves at a fixed speed in a selected direction even if the track ball 21 or the rotary ring 22 is not manually operated. Further, if the track ball 21 or the rotary ring 22 is manually operated by a plurality of times while the motion holding switch 28 is kept depressed, then the special image moves by a greatest one of amounts of rotation inputted by the manual operations.

However, it is otherwise possible to construct the three-dimensional image special effect apparatus such that the special image moves conversely by that one of the amounts of rotation inputted by such manual operations as described just above or the special image continues to move in accordance with one of the amounts of rotation instructed by a first one of the manual operations or else the special image continues to move in accordance with a value obtained by addition or subtraction between an amount of rotation instructed at the last manual operation and another amount of rotation instructed at the second last manual operation.

Further, if a toggle switch not shown is provided in place of the motion holding switch 28, the special image can continue to move only by manually operating the track ball 21 or the rotary ring 22 once with the toggle switch held tilted to the motion holding mode side.

As described so far, with the three-dimensional image special effect apparatus of the present embodiment, an amount of rotation of the track ball or the rotary ring is held, and a special image is continuously moved in accordance with the thus held amount of rotation.

Accordingly, when it is tried to move the special image to a long distance, it is required to manually operate the track ball or the rotary ring only once, and consequently, the operability is improved advantageously. Further, since the special image moves smoothly at an equal speed, advantageously the image can be observed easily.

FIG. 12 shows another three-dimensional image special effect apparatus to which the present invention is applied. Referring to FIG. 12, the three-dimensional image special effect apparatus 1 shown is a modification to and different from the three-dimensional image special effect apparatus of the first embodiment described hereinabove with reference to FIG. 1 only in that it includes, in place of the motion holding switch 28 shown in FIG. 1, an output mode setting switch 128.

The output mode setting switch 128 has a free mode position for a free mode and an X or Y mode position for an X or Y mode. When the output mode setting switch 128 is positioned at the free mode position, amounts of rotation of the track ball 21 in the X direction and the Y direction, that is, count values of both of the X counter 23 and the Y counter 24, are supplied to the image special effect processing section 15. On the other hand, when the output mode setting switch 128 is positioned at the X or Y mode position, only a greater one of an amount of rotation of the track ball 21 in the X direction and another amount of rotation of the track ball 21 in the Y direction, that is, a higher one of count values of the X counter 23 and the Y counter 24, is supplied to the image special effect processing section 15.

The track ball 21, rotary ring 22, cursor switch 26, three-dimensional inputting switch 27, output mode setting switch 128 and data inputting switches 29 are mounted on such a panel 2 as shown in FIG. 13.

Here, if the output mode setting switch 128 is positioned at the X or Y mode position, a difference between absolute values of the output of the X counter 23 and the output of the Y counter 24 is calculated by the CPU 11, and only one of the outputs which has a higher value is supplied to the graphic display production section 14.

Accordingly, when the track ball 21 is manually operated, if the count value of, for example, the X counter 23 is higher, the cursor 51 moves only in a horizontal direction. On the contrary if the count value of the Y counter 24 is higher, the cursor 51 moves only in a vertical direction. Consequently, the cursor 51 can be positioned at a predetermined position simply with a high degree of accuracy.

On the other hand, when the output mode setting switch 128 is positioned at the free mode position, both of the count values of the X counter 23 and the Y counter 24 are supplied to the graphic display production section 14. Consequently, the cursor 51 can be moved in an arbitrary position.

When it is intended to manually operate a special image after such parameters as described hereinabove are set, the three-dimensional inputting switch 27 will be turned on. Consequently, the track ball 21 and the rotary ring 22 thereafter serve as three-dimensional inputting means and can manually operate a special image on the image monitor 16. In this instance, if the output mode setting switch 128 is positioned at the X or Y mode position, the special image can be moved only in a horizontal direction or a vertical direction by manual operation of the track ball 21, and consequently, the special image can be moved to a predetermined position with a high degree of accuracy. In contract, if the output mode setting switch 128 is positioned to the free mode position to change the output mode to the free mode, the special image can be moved in an arbitrary direction by manual operation of the track ball 21.

In the present embodiment, since the support roller 38 for detecting an amount of rotation in the X direction and the support roller 39 for detecting an amount of rotation in the Y direction extend perpendicularly to each other, when the track ball 21 is rotated in a direction displaced toward the X direction from a middle direction between the X direction and the Y direction, that is, from the direction of 45 degrees in FIG. 13, the special image or the cursor 51 moves in a horizontal direction, but when the track ball 21 is rotated in another direction displaced toward the Y direction from the direction of 45 degrees, the special image or the cursor 51 moves in a vertical direction.

FIG. 14 illustrates a procedure of output processing 160 of the three-dimensional image special effect apparatus 1 when the output mode is the X or Y mode. Referring to FIG. 14, in the output processing 160 illustrated, the output values X and Y are first set to X=0 and Y=0, respectively, at step 161, and then at step 162, the output values X and Y are set to X=X1 (count value of the X counter 23) and Y=Y1 (count value of the Y counter 24), respectively. Then, it is determined at step 163 whether or not an absolute value of the count value X1 of the X counter 23 is equal to or higher than an absolute value of the count value Y1 of the Y counter 24. In other words, it is determined here in which one of the X direction and the Y direction the track ball 21 is rotating by a greater amount.

If it is determined at step 163 that the absolute value of the count value X1 is equal to or higher than the absolute value of the count value Y1, only the count value X1 of the X counter 23 is supplied to the graphic display production section 14 or the image special effect processing section 15 subsequently at step 164. Consequently, the special image or the cursor 51 moves in a horizontal direction, thereby completing the output processing 60 in the X or Y mode.

On the contrary if it is determined at step 63 that the count value Y1 of the Y counter 24 is higher than the count value of the X counter 23, only the count value of the Y counter 24 is supplied to the graphic display production section 14 or the image special effect processing section 15 at step 165. Consequently, the special image or the cursor 51 moves in a vertical direction, thereby completing the outputting processing 160 in the X or Y mode.

The outputting processing 160 in the X or Y mode allows transmission of a movement of the track ball 21 to the special image or the cursor 51 with fidelity by executing the same repetitively, for example, for each one field (in the case of 60 Hz, for 16 ms) of the image.

It is to be noted that, while in the embodiment described above a special image or the cursor 51 moves in only two directions including a vertical direction and a horizontal direction in response to a manual operation of the track ball 21, it is otherwise possible to move a special image or the cursor in three or more directions.

As described above, the three-dimensional image special effect apparatus of the present embodiment allows operation of a special image or a cursor only in a horizontal direction or a vertical direction in accordance with one of an X direction and a Y direction of rotation of a track ball, that is rotatable in an arbitrary direction, in which the track ball is rotated by a greater amount.

Accordingly, with the three-dimensional image special effect apparatus, positioning of the special image or the cursor can be performed with a high degree of accuracy by means of the track ball which itself is unstable in operation. Further, since rotation of the track ball is restricted to only one direction by software, cancellation of a rule regarding a direction or change of a direction can be performed readily.

FIG. 15 shows a further three-dimensional image special effect apparatus to which the present invention is applied. Referring to FIG. 15, the three-dimensional image special effect apparatus 1 shown is a modification to and different from the three-dimensional image special effect apparatus of the first embodiment described hereinabove with reference to FIG. 1 in that it includes, in place of the motion holding switch 28 shown in FIG. 1, a movement amount setting switch 228 for setting a normal movement mode in which the distance of movement of a special image with respect to an amount of operation of the track ball 21 or the rotary ring 22 is varied in response to a distance in a depthwise direction or a fixed amount movement mode in which the distance of movement is fixed irrespective of the distance in a depthwise direction.

The track ball 21, rotary ring 22, cursor switch 26, three-dimensional inputting switch 27, movement amount setting switch 228 and data inputting switches 29 are mounted on such a panel 2 as shown in FIG. 16.

Here, in order to operate a special image, the three-dimensional inputting switch 27 will first be turned on. Consequently, the track ball 21 and the rotary ring 22 thereafter serve as operation means for operating the special image. Then, when it is desired to fix the distance of movement of the special image with respect to the amount of rotation of the track ball 21 or the rotary ring 22 irrespective of the distance to the special image, the fixed amount movement mode will be set by means of the movement amount setting switch 228.

In the fixed amount movement mode, input data, that is, count values X1, Y1 and Z1 of the counters 23, 24 and 25 and a distance Z0(A) or Z0(B) in the Z direction between an origin, which is at a position spaced by a predetermined distance L in the Z direction from the screen of the monitor 16, and a special image A or another special image B as seen in FIG. 17A are supplied to the CPU 11. The CPU 11 thus substitutes the data supplied thereto, for example, into a set of equations (1) given below to calculate depthwise distance information f(Z0) and output data X, Y and Z for the X, Y and Z directions:

$$f(Z0)=1+Z0/L$$
$$X=X1 \times f(Z0)$$
$$Y=Y1 \times f(Z0)$$
$$Z=Z1 \times f(Z0) \qquad (1)$$

where f(Z0) is depthwise distance information, Z0 is a distance between the origin and the special image, L is a distance between the origin and the screen of the monitor 16, X, Y and Z are output data, and X1, Y1 and Z1 are input data.

The output data X, Y and Z calculated in this manner are supplied to the image special effect processing section 15, by which the special image is operated in accordance with the data. It is to be noted that, in the present embodiment, the origin is set such that, if the sizes of the special image and the screen of the monitor 16 are equal to each other, then when the special image is at the origin, it is displayed in a full scale on the screen. Then, when a special image A in the proximity and another special image B at a remote distance are displayed on the monitor 16, the special image B at the remote distance is displayed with a smaller size than the special image A in the proximity as seen in FIG. 17B. Consequently, a perspective feeling can be obtained.

In the fixed amount movement mode, as can be seen from the equations (1) above, as the distance Z0 between the origin and the special image increases, the increasing rate of the output data X, Y and Z with respect to the input data X1, Y1 and Z1 increases. In particular, it is assumed that, for example, when the track ball 21 is rotated by one rotation, the special image A at the distance Z0 from the origin moves by the distance X2 on the screen of the monitor 16 as seen in FIG. 18A. Here, when the track ball 21 is rotated by one rotation in the same direction, also the remote special image B at the distance twice that of the special image A moves by the distance X2 on the screen of the monitor 16 as shown in FIG. 18B.

Also when it is intended to move the special images A and B in the Y direction or the Z direction, the special image B at the remote distance in the Z direction and the special image A in the neighborhood move by an equal distance on the screen of the monitor 16 in response to an equal amount of rotation of the track ball 21 or the rotary ring 22 similarly as described above. Consequently, even when it is tried to move the special image B at the remote distance in the Z direction over a long distance on the screen of the monitor 16, the track ball 21 or the rotary ring 22 need not be rotated very much, and consequently, the operation is facilitated. Further, in this instance, even if the track ball 21 or the rotary ring 22 is rotated by an equal amount, the distance of movement of the special image A in the neighborhood is smaller, and consequently, accurate positioning can be achieved.

It is to be noted that, while output data X, Y and Z are calculated in the present embodiment using the equations (1) given hereinabove, various special effects can be achieved if suitable equations which vary output data X, Y and Z in response to the distance of a special image in the Z direction are employed.

In contrast, when it is desired, similarly as in the prior art, to move, adding a perspective feeling, a special image keeping a 1:1 corresponding relationship to the distance in a depthwise direction, the normal movement mode will be set by means of the movement amount setting switch 228. In the normal movement mode, when the track ball 21 is rotated, for example, by one rotation, the special images A and B move by an equal distance X0 at the locations as seen in FIG. 17A. In this instance, if it is assumed that the special image A in the neighborhood moves by a distance X3 on the screen of the monitor 16 as seen in FIG. 19A, then the distance X4 of movement of the special image B at the remote distance is smaller than the distance X3 as seen from FIG. 19B. Consequently, when viewed on the monitor 16, the special images A and B move in a natural feeling in response to the distances Z0(A) and Z0(B) in the depthwise direction, respectively.

FIG. 20 illustrates a procedure of input data modification processing 260 of the three-dimensional image special effect apparatus 1 of the present embodiment. In the input data modification processing 260, count values X1, Y1 and Z1 of the counters 23, 24 and 25 are placed as output data X, Y and Z, respectively, at step 261. Subsequently, it is determined at step 262 whether or not the three-dimensional image special effect apparatus 1 is in the fixed amount movement mode, and if the discrimination is the fixed amount movement mode, then the count values X1, Y1 and Z1 are multiplied by depthwise distance information f(Z0) in accordance with the equations (1) and resulted values are replaced into the output data X, Y and Z, respectively, at step 263. Subsequently, the output data X, Y and Z are outputted at step 264. The output data X, Y and Z are thus supplied to the image special effect processing section 15 so that a special image is moved in accordance with the data X, Y and Z.

On the contrary if it is discriminated at step 262 that the three-dimensional image special effect apparatus 1 is not in the fixed amount movement mode, that is, the three-dimensional image special effect apparatus is in the normal movement mode, then the count values X1, Y1 and Z1 are outputted as they are as output data X, Y and Z, respectively, at step 264. Subsequently to step 264, the count values X1, Y1 and Z1 are placed as output data X, Y and Z, respectively, at step 261, whereafter similar processing to that described above is performed repetitively.

It is to be noted that, while the track ball 21 and the rotary ring 22 are used as data inputting means in the present embodiment described above, the present invention can be applied to other three-dimensional inputting apparatus which include a joy-stick or some other data inputting means.

As described above, the three-dimensional image special effect apparatus of the present embodiment is constructed such that input data are modified and outputted in accordance with a distance of a special image in a depthwise direction. Accordingly, with the three-dimensional image special effect apparatus of the present embodiment, even when it is tried to move a special image at a remote distance in a depthwise direction, the data inputting section such as a track ball or a rotary ring need not be manually operated very much as in a conventional three-dimensional image special effect apparatus, and consequently, the operability is improved advantageously.

It sometimes occurs that, after the three-dimensional inputting switch 27 is turned on in order to operate a special image, when none of the track ball 21 and the rotary ring 22 is manually operated, the track ball 21 or the rotary ring 22 is rotated by an impact upon strong depression of, for example, the motion holding switch 28. In this instance, an amount of rotation of the track ball 21 or the rotary ring 22 is detected by the counters 23, 24 and 25, and count values X1, Y1 and Z1 of the counters 23, 24 and 25 are supplied to the CPU 11. In this instance, also data inputted by means of the motion holding switch 28 are supplied to the CPU 11.

When three-dimensional data outputted from any of the counters 23, 24 and 25 and other data are supplied simultaneously to the CPU 11 in this manner, the CPU 11 determines that vibrations have been applied to the track ball 21 or the rotary ring 22 by depression of the motion holding switch 28 or some other key so that the three-dimensional data have been inputted. In this instance, the CPU 11 inhibits the outputs of the counters 23, 24 and 25 from being supplied to the image special effect processing section 15. Consequently, the special image will not be moved inadvertently.

It is to be noted that, while, in the present embodiment, outputting of three-dimensional data from the counters 23, 24 and 25 is limited by software by operation of the CPU 11, it is otherwise possible to limit outputting of three-dimensional data using a change-over switch not shown. In this instance, while data other than three-dimensional data continue to be inputted, the change-over switch should be turned off to prevent three dimensional data from being outputted.

For example, if the rotary ring 22 is rotated by vibrations while, for example, a parameter is being set, the value of the parameter is varied inadvertently, and with the present three-dimensional image special effect apparatus 1, if data from any of the counters 23, 24 and 25 and data from any other component are inputted at a time, the CPU 11 discriminates that the rotary ring 22 or the track ball 21 has been rotated by vibrations. The CPU 11 thus prevents the data from any of the counters 23, 24 and 25 from being supplied to the graphic display production section 14. Consequently, a possible influence of vibrations can be eliminated.

When it is intended to operate the special image after the parameters are set in this manner, the three-dimensional inputting switch 27 will be turned on. Consequently, the track ball 21 and the rotary ring 22 thereafter serve as three-dimensional inputting means and can operate the special image on the video monitor.

FIG. 21 illustrates a procedure of three-dimensional data outputting processing 360 of the three-dimensional image special effect apparatus 1. In the three-dimensional data outputting processing 360, after three-dimensional data X1, Y1 and Z1 are inputted at step 361, current coordinates X0, Y0 and Z0 of a special image are placed, at step 362, as output data X, Y and Z, respectively. Subsequently, it is discriminated at step 363 whether or not data other than three-dimensional data have been inputted. In particular, it is discriminated here whether or not the panel 2 has been vibrated as a result of depression of the data inputting switch 27 or some other key and such vibrations have rotated the track ball 21 or the rotary ring 22 thereby to input three-dimensional data.

When it is determined at step 363 that no data other than three-dimensional data have been inputted, the coordinate data X0, Y0 and Z0 of the special image are added to the inputted three-dimensional data X1, Y1 and Z1 and the sums of them are replaced into the output data X, Y and Z, respectively, at step 366. The output data X, Y and Z are outputted at step 365, thereby completing the three-dimensional data outputting processing 360. In this instance, the special image is moved only by a distance corresponding to the inputted three-dimensional data.

In the three-dimensional image special effect apparatus of the present embodiment, since detection of vibrations is performed all by software as described above, a possible influence of vibrations can be prevented without adding any other part to an existing three-dimensional inputting apparatus. It is to be noted that, as a vibration detection method, various detection methods may be employed such as, for example, a method which employs an acceleration sensor which directly detects vibrations of the panel 2 or another method which employs a microphone which detects a sound when the panel 2 is hit to detect vibrations.

As described above, in the three-dimensional image special effect apparatus of the present embodiment, when predetermined data such as, for example, three-dimensional data are inputted, it is detected whether or not vibrations have been applied to the inputting means, and when vibrations have been applied, the inputted predetermined data are prevented from being outputted.

Accordingly, with the three-dimensional image special effect apparatus of the present embodiment, it can be prevented advantageously that a value of a special image or a parameter is varied by vibrations, and consequently, the sensitivity of data inputting means such as a track ball or a rotary ring can be increased comparing with that of conventional three-dimensional image special effect apparatus.

Having now fully described the invention, it will be apparent to one of ordinary skill in the art that many changes and modifications can be made thereto without departing from the spirit and scope of the invention as set forth herein.

What is claimed is:

1. An image special effect apparatus comprising:

a track ball for operating a special image produced by an image special effect processing section in first and second directions;

first rotation detection means for detecting an amount of rotation of said track ball in said first direction and having a first output signal indicating said amount of rotation of said track ball in said first direction;

second rotation detection means for detecting an amount of rotation of said track ball in said second direction and having a second output signal indicating said amount of rotation of said track ball in said second direction;

rotational amount comparison means for comparing said first and second output signals with each other; and means for outputting a one of said output signals which is determined by said rotational amount comparison means to have a higher value for operating said special image.

2. A three-dimensional image special effect apparatus according to claim 1 further comprising:

a display monitor for displaying said special imager said means for outputting one of the outputs being coupled to said display monitor so as to control motion of said special image on said display monitor.

3. A three-dimensional image special effect apparatus according to claim 1 further comprising:

means for outputting said outputs of both said first and second output signals; and a switch which, when in a first position, enables said means for outputting one of said output signals and disables said means for outputting both of said output signals and, when in a second position, disables said means for outputting one of said output signals and enables said means for outputting both of said output signals.

4. A method for controlling motion of an image on a display apparatus by operation of a track ball, said method comprising the steps of:

detecting an amount of rotation of said track ball in a first direction;

detecting an amount of rotation of said track ball in a second direction perpendicular to said first direction;

comparing said first and second amounts of rotation with each other; and outputting to said display apparatus a one of said amounts of said first and second rotations which has a higher value for controlling said motion of said image.

5. A method according to claim 4 wherein a period for determining the amount of rotation is set at a period for a field of the display apparatus.

6. A method according to claim 5 wherein said field period is 16 ms.

7. A method according to claim 6 wherein said steps are repeated every 16 ms.

* * * * *